(12) United States Patent
Hirota et al.

(10) Patent No.: US 7,038,641 B2
(45) Date of Patent: May 2, 2006

(54) COLOR/BLACK-AND-WHITE SWITCHABLE PORTABLE TERMINAL AND DISPLAY UNIT

(75) Inventors: Shouichi Hirota, Hitachi (JP); Makoto Tsumura, Hitachi (JP); Ikuo Hiyama, Hitachi (JP); Takayuki Oouchi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 6 days.

(21) Appl. No.: 10/752,508

(22) Filed: Jan. 8, 2004

(65) Prior Publication Data

US 2004/0140972 A1 Jul. 22, 2004

Related U.S. Application Data

(63) Continuation of application No. 09/763,806, filed as application No. PCT/JP00/03312 on May 24, 2000, now abandoned.

(51) Int. Cl.
*G09G 3/32* (2006.01)

(52) U.S. Cl. .............................. 345/83; 345/90; 345/92; 345/102; 345/211; 345/212; 345/213

(58) Field of Classification Search ............ 345/82–83, 345/87–88, 90, 92, 102, 211–213, 76
See application file for complete search history.

(56) References Cited

U.S. PATENT DOCUMENTS

| | | | |
|---|---|---|---|
| 5,534,883 A | 7/1996 | Koh | |
| 5,543,958 A | 8/1996 | Lebby et al. | |
| 5,576,723 A * | 11/1996 | Asprey | 345/3.1 |
| 5,638,199 A * | 6/1997 | Tsubota et al. | 349/110 |
| 5,689,321 A | 11/1997 | Kochi | |
| 5,815,228 A | 9/1998 | Flynn | |
| 6,035,180 A | 3/2000 | Kubes et al. | |
| 6,115,016 A * | 9/2000 | Yoshihara et al. | 345/88 |
| 6,131,046 A | 10/2000 | Sano et al. | |
| 6,175,353 B1 * | 1/2001 | Hoeksma | 345/102 |
| 6,184,955 B1 | 2/2001 | Okumura | |
| 6,219,119 B1 | 4/2001 | Nakai | |
| 6,232,937 B1 | 5/2001 | Jacobsen et al. | |
| 6,285,422 B1 | 9/2001 | Maeda et al. | |
| 6,300,989 B1 | 10/2001 | Iijima | |
| 6,315,440 B1 | 11/2001 | Satoh | |

(Continued)

FOREIGN PATENT DOCUMENTS

JP    5-19257    1/1993

(Continued)

*Primary Examiner*—Amr A. Awad
*Assistant Examiner*—Leonid Shapiro
(74) *Attorney, Agent, or Firm*—Antonelli, Terry, Stout and Kraus, LLP.

(57) ABSTRACT

A display unit has a brightness equal to that in a conventional black-and-white reflection type and the power consumption is small at a standby time, and bright color display of high quality can be produced and power consumption is small at the time of use. An information device having this display unit, such as a portable phone, also is provided. The display unit has a color light emitting means, a reflecting mean of external light and a light polarizing state modulating means. The display unit has a driving method switching means for switching color light emitting display and reflection display by on/off control of the light emitting means and switching control of a driving method of a display element.

6 Claims, 17 Drawing Sheets

U.S. PATENT DOCUMENTS

| | | |
|---|---|---|
| 6,317,180 B1 | 11/2001 | Kuroiwa et al. |
| 6,347,882 B1 | 2/2002 | Vrudny et al. |
| 6,424,326 B1 | 7/2002 | Yamazaki et al. |
| 6,452,577 B1 | 9/2002 | Gale et al. |
| 6,466,783 B1 | 10/2002 | Dahm et al. |
| 6,504,589 B1 * | 1/2003 | Kashima et al. ............... 349/96 |
| 6,724,354 B1 * | 4/2004 | Spitzer et al. ................ 345/32 |
| 6,763,247 B1 * | 7/2004 | Hollstrom et al. ....... 455/556.1 |

FOREIGN PATENT DOCUMENTS

| | | |
|---|---|---|
| JP | 10-105328 | 4/1998 |
| JP | 2000-10529 | 1/2000 |

\* cited by examiner

FIG. 7(a)
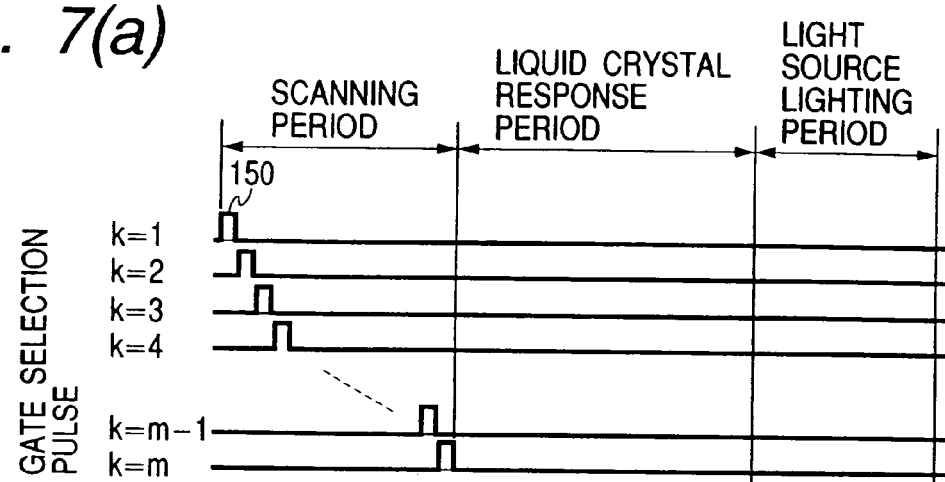
FIG. 7(b)
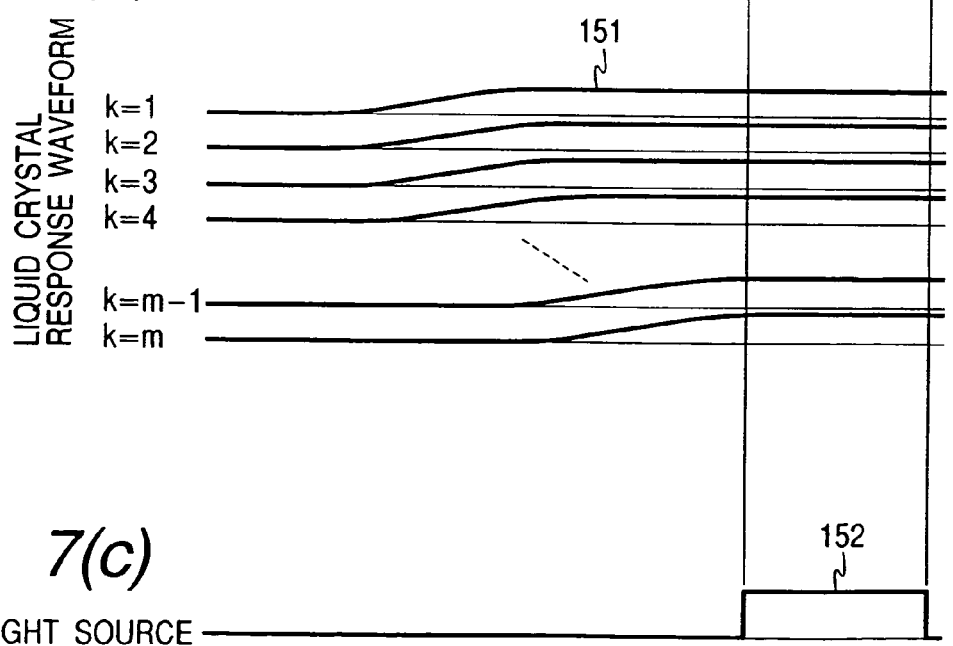
FIG. 7(c)

FIG. 17(a)
FIG. 17(b)
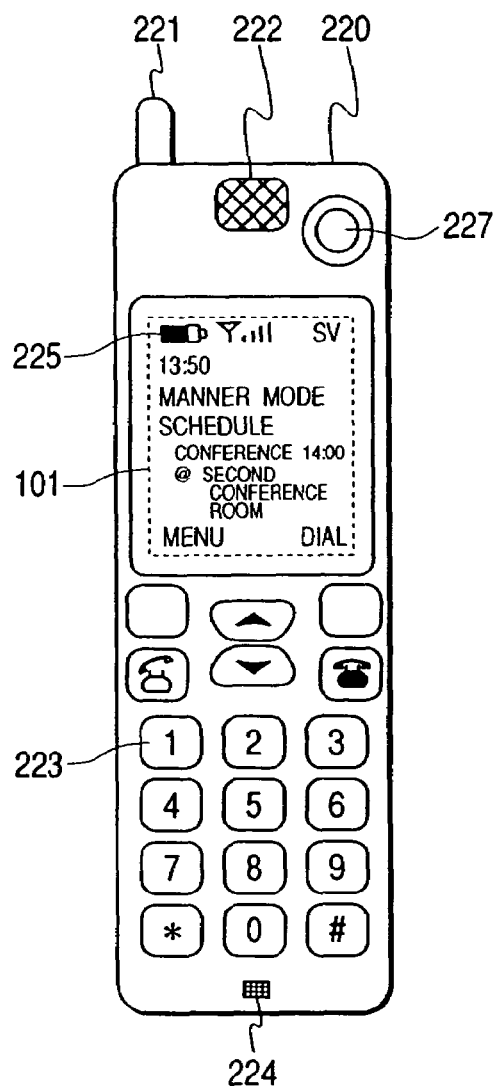
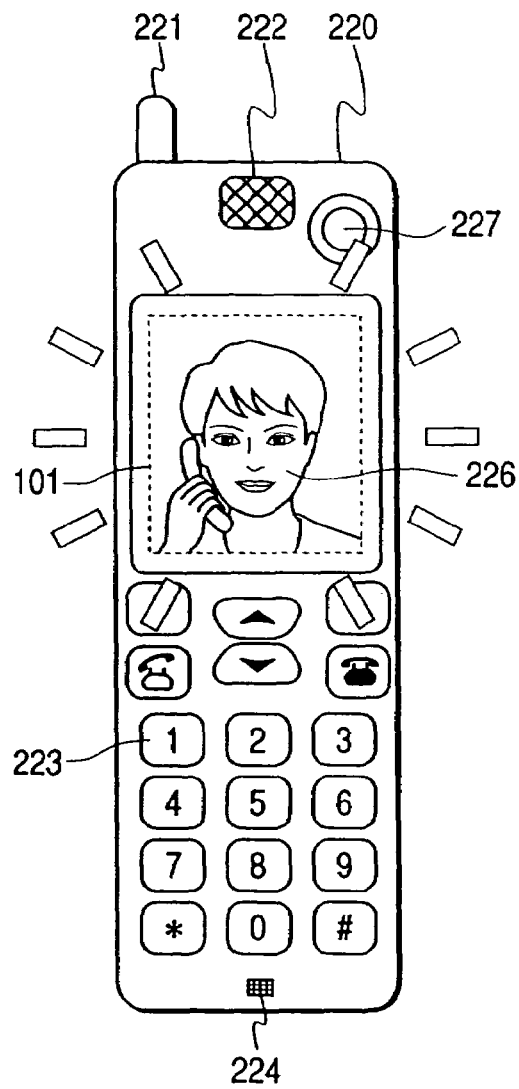

FIG. 20
⟨HTML⟩⟨HEAD⟩⟨TITLE⟩BODY⟨/TITLE⟩ ⟨/HEAD⟩ ⟨BODY⟩
⟨BODY bgcolor="#FFFF80" text="#FF0000" link="#0000FF" ⟩
THE PRESENT TEXT ON SCREEN IS DISPLAYED IN RED
FONT A WITH LIGHT YELLOW BACKGROUND.
LINK IS DISPLAYED IN BLUE FONT.
⟨/BODY⟩
⟨/HTML⟩
FIG. 21
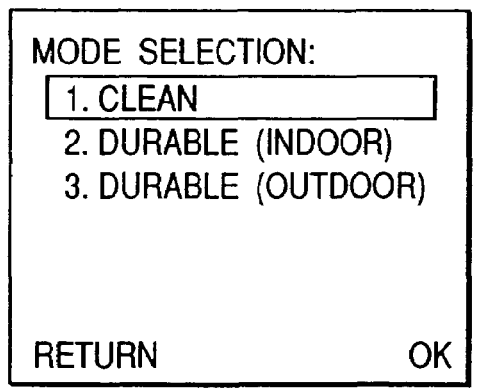
FIG. 22
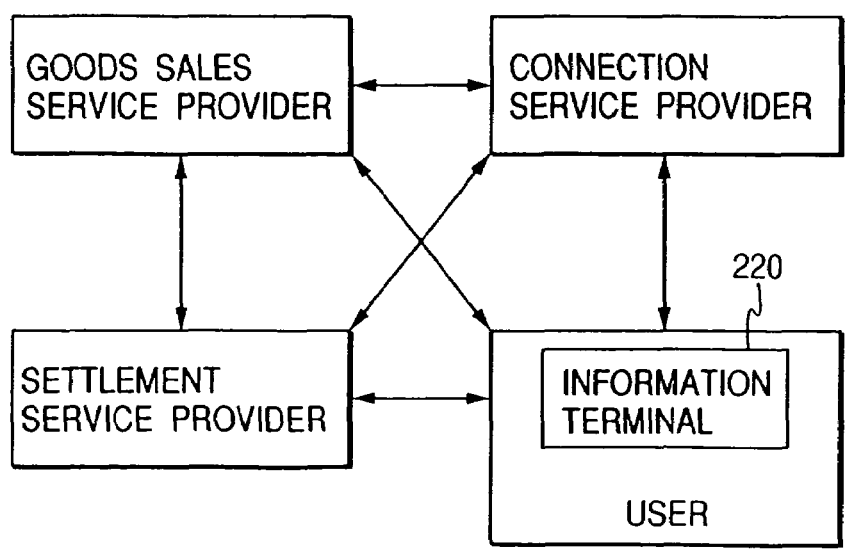

COLOR/BLACK-AND-WHITE SWITCHABLE PORTABLE TERMINAL AND DISPLAY UNIT

CROSS-REFERENCE TO RELATED APPLICATIONS

This is a continuation of application Ser. No. 09/763,806 filed 27 Feb. 2001, now abandoned, which is a 371 of PCT/JP00/03312, filed May 24, 2000.

TECHNICAL FIELD

The invention relates to a display unit and a device using this display unit, such as a portable phone, a portable information terminal, a home electric product, etc.

BACKGROUND OF THE INVENTION

With respect to a technique for displaying colors in the display unit of a portable information device, Japanese Patent Laid-Open No. 213799/1998 discloses a technique relating to a reflection type color display produced by a color filter system having auxiliary illumination. Japanese Patent Laid-Open No. 106328/1998 discloses a technique relating to a liquid crystal display unit for both reflection and transmission using a reflecting layer having a light polarizing state maintaining property. Japanese Patent Laid-Open No. 19257/1993 discloses a technique relating to a field sequential color system operating as a color display system in which no color filter is required. Japanese Patent Laid-Open No. 10529/2000 discloses a technique relating to a liquid crystal color display driving method in which red, green and blue liquid crystal element operating signals are synthesized and set to a monochromatic video signal on the basis of a consumed power restraining command signal, and power consumption is reduced by displaying only this monochromatic image.

As mentioned above, high image quality, color and low power consumption are required in a portable information device, but many problems, which are described below, exist in the display technique employed by the conventional color portable information device.

SUMMARY OF THE INVENTION

First, in the reflection type color display of a system using a color filter, a problem exists in that the display image is dark and is not easily seen in comparison with the reflection type black-and-white display, due to the absorption of light by the color filter each time external light and auxiliary illumination are used. It is necessary to construct one pixel three subpixels of red, green and blue (hereinafter respectively called R, G and B) to perform the color display. Therefore, a problem also exists in that three-times the power in the image display is required at any time in comparison with a black-and-white display. Further, since the same driving system is adopted at each time a device is in use and at a standby time (a transmission display time and a reflection display time), the difference in consumed power is only equal to the difference in consumed power of the light source itself due to turning-on and turning-off of the light source. Therefore, room for improvement is also left as far as reduction in power consumption is concerned. Further, when a half mirror, a semi-transmitting reflection plate or a partial transmitting reflection plate having a partial opening portion, etc. are used as an external light reflecting means, a trade-off exists between luminance at the transmission display time and luminance at the reflection display time. Therefore, the image quality of incomplete brightness is formed in any display quality.

Accordingly, when a color display system using a color filter is adopted, a problem exists in that the power consumption is large and a dark display image is formed in comparison with the black-and-white liquid crystal display unit at each of the reflection display time and the transmission display time (auxiliary light source using time).

In contrast to this, if a field sequential color display system using no color filter is adopted, the problem of the above-mentioned color filter can be solved, and a high image quality can be obtained. However, in this case, the light source must be lighted at any time to display the image, and it is considered that room for improvement is yet left as far as reduction in power consumption is concerned in a device which has plural modes of operation at the so-called device using time and the standby time (transmission display time and reflection display time).

Therefore, an object of the invention is to provide a display unit for reducing power consumption which is able to produce a color display, or a portable information device having this display unit, such as a portable phone, etc.

In accordance with one embodiment of the invention, a display unit having a light source has a mode switching section for switching a displayed image mode, a light source control section for controlling operation of the light source in accordance with instructions from the mode switching section, an image signal processing section for processing an image signal in accordance with instructions from the mode switching section, and a liquid crystal cell for displaying an image in accordance with the image signal from the image signal processing section. Accordingly, it is possible to realize a bright display unit with reduced power consumption and high contrast in each of a light emitting display and a reflection display.

In one embodiment, the image signal processing section of a driving section has a digital-analog converter and a level shifter. When the mode switching section switches the display mode to a multi-gradation display mode, the image signal generating section generates the image signal of analog multi-gradation by using the digital-analog converter. When the mode switching section switches the display mode to a two-gradation display mode, the image signal generating section generates an image signal of analog binary gradation by using the level shifter. Accordingly, the driving method can be switched by using such a construction so that optimum power can be selected at any time, and consumed power can be optimized, and power consumption can be reduced.

Further, in another embodiment, the display element has a liquid crystal cell having a pair of transparent substrates, a liquid crystal layer located between the pair of transparent substrates, and an electrode group arranged on at least one of the pair of transparent substrates; a light polarizing maintaining diffusion reflection plate arranged on one face of the liquid crystal cell; a light guide body arranged between the liquid crystal cell and the light polarizing maintaining diffusion reflection plate such that the light source is arranged on a side face of the light guide body; and a light polarizing maintaining scattering layer arranged between the light guide body and the liquid crystal cell. Accordingly, it is possible to realize a display unit in which the light utilization efficiency is further increased, and the problem of a double image is also solved in addition to the effects in which power consumption is reduced and the display of high contrast can be performed in each of the light emitting display and the reflection display.

Further, in an example taken from a separate viewpoint of the invention, the display element has a liquid crystal cell having a pair of substrates; a liquid crystal layer disposed between the pair of substrates; plural pixels formed by an electrode arranged on at least one of the pair of substrates; and a light source arranged in accordance with each of the plural pixels and constructed by including a metallic electrode, an organic LED layer and a transparent electrode from a substrate side. Accordingly, an image is displayed by adjusting the luminance of the organic LED at a color light emitting display time, and adjusting the luminance of the liquid crystal at a reflection display time. Thus, bright image display with reduced power consumption and high contrast can be realized, and the display element can be entirely reduced in thickness.

BRIEF DESCRIPTION OF THE DRAWINGS

FIGS. 7(a) to 7(c) are signal diagrams showing the relation of a scanning period, a liquid crystal response period and a light source lighting period, respectively.

FIGS. 17(a) and 17(b) are diagrams showing the schematic appearance of a portable phone in an embodiment 6 of the invention.

FIG. 20 is a diagram which shows an example of a description using the markup language.

FIG. 21 is a diagram which shows an example of a display mode selection screen in the portable phone.

FIG. 22 is a diagram which shows an example of electronic commercial transactions.

BEST MODE FOR CARRYING OUT THE INVENTION

Figure 1:
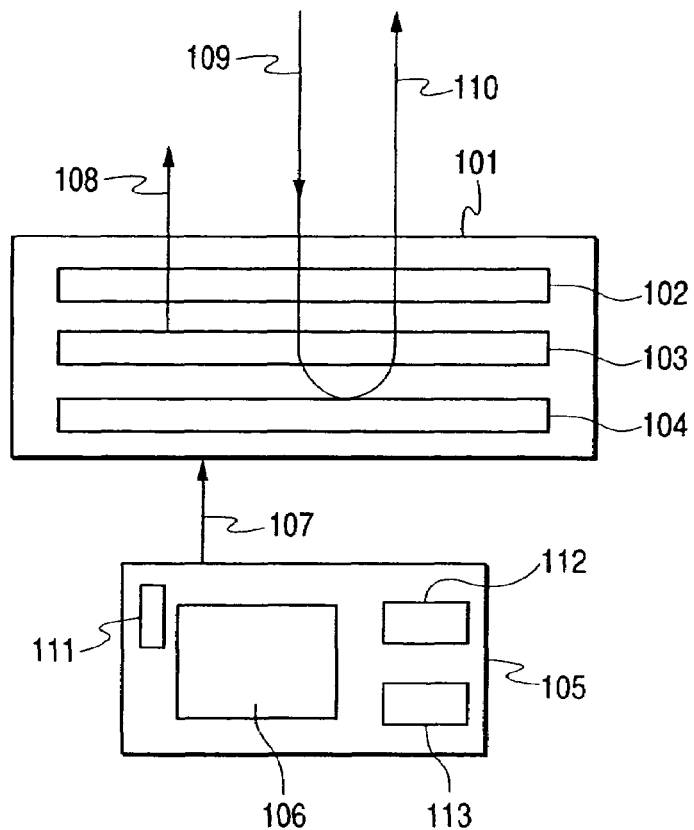
FIG. 1 is a schematic diagram showing one embodiment of a display unit of the invention.

One embodiment of a display unit of the present invention will be explained with reference to FIG. 1. The display unit of FIG. 1 is mainly constructed to include a display element 101 and a driving section 105 for operating the display element 101. The driving section 105 will first be explained.

The driving section 105 has a signal processing switching section 106, a light source control section 111, and signal processing sections 112, 113.

The signal processing switching section 106 performs switching control of a processing method of an image signal displayed in the display element 101 and on/off control of a color light emitting means 103 through a driving signal interface 107 at any time. The switching control of the image signal processing method for displaying the image signal in the display element 101, e.g., refers to switching control of a color light emitting display and reflection display in accordance with a display state. For processing display data, for example, one of the signal processing sections 112, 113 is selected, switched and controlled in the switching control of the image signal processing method. Each of the signal processing sections 112, 113 processes an image signal inputted from the outside, and converts the inputted image signal to an image signal suitable for display, or generates a suitable image signal. The arrangement of plural signal processing sections for performing such operations means that the driving section 105 has plural paths for processing the image signal. In a concrete example of the switching control of the signal processing method, there are switching control of a driving frequency, switching control of each case of using and not using a digital/analog converter, switching control of the number of operated pixels, switching control of a circuit block for supplying a clock, etc. The light source control section 111 is a circuit section for controlling operation of the light source arranged in the display element 101, and operation of the light source control section 111 is controlled by the signal processing switching section 106. Each of these sections will be explained in detail in a later embodiment.

The switching control of the signal processing method, i.e., selection switching of the signal processing section, can be performed by adopting such a construction. This finally means that consumed power can be switched. Accordingly, it is possible to supply power in accordance with the amount required at each of the color light emitting display time and the reflection display time. Therefore, display with high definition and high quality can be performed at the color light emitting display time, and the unnecessary use of power can be reduced, whereby the consumed power can be optimized, and power consumption can be greatly reduced at the reflection display time. As a matter of course, power can be also reduced by turning-on and turning-off the color light emitting means 103.

The driving section 105 in the display unit has plural signal processing sections 112, 113 and the signal processing switching section 106. Power consumption of the display unit is reduced by switching the plural signal processing sections using this signal processing switching section 106 at any time. This simultaneously means that one display element has plural display states. Accordingly, it is necessary to set the display element itself to be adapted to the plural display states. Therefore, the display element 101 also can be designed to be combined with the driving circuit section 105 so that power consumption is further reduced and image quality is further improved. In the following embodiments, an explanation will be given of the use of one signal processing switching section and the plural signal processing sections, but one signal processing section and plural signal processing paths may be also arranged, or the signal processing switching section can be also arranged within the signal processing section when these actions are obtained. Various different modifications are included in a range of possibilities, in which plural signal processing paths can be arranged and selection control can be performed.

The display element 101 will be explained next.

The display element 101 is constructed by including a light polarizing state modulating means 102, a colored light emitting means 103 for emitting colored light, and an external light reflecting means 104 for reflecting external light 109. The colored light emitting display refers to both a case in which an illuminating means other than for external light is arranged, and light emitted from this illuminating means is modulated by the light polarizing state modulating means and is displayed as an image, and a case in which a light emitting element is included and formed in each pixel of the display element, and an image is displayed by adjusting the light emission and luminance of each light emitting element. In the former case, for example, there is a liquid crystal display element in which a backlight is set to the illuminating means and a liquid crystal element is used as a luminance adjusting means. In this case, the liquid crystal display element is the light polarizing state modulating means 102, and the backlight is the colored light emitting means 103. In the latter case, there is a display element using an organic LED (Light Emitting Diode) display element and an organic EL (also called Electroluminescence) display element. In this case, the liquid crystal display element also corresponds to the light polarizing state modulating means 102, but the organic LED display element corresponds to the colored light emitting means 103. These examples and effects peculiar to this construction will be explained in later embodiments.

One of the common features of the display element 101 is that the colored light emitting means 103 is arranged between the light polarizing state modulating means 102 and the external light reflecting means 104. Thus, the display element 101 of the invention can use a mirror of total reflection as the external light reflecting means 104, instead of a half mirror as used in the conventional display element. Accordingly, there is no loss of light due to the half mirror at each of the reflection display time and the colored light emitting display time. Namely, no trade-off relation is formed in luminance between both of the displays. In a detailed explanation, almost all of each of the external light 109 and the emitted light 108 is emitted to the exterior (upward in FIG. 1) of the display element 101 by the external light reflecting means 104, etc., and light can be efficiently utilized so that display of high contrast can be performed and the display quality can be improved. Further, the light emitting means arranged on an upper face of the external light reflecting means has a function of the colored light emitting display so that a bright colored light emitting display can be produced without using a color filter. Furthermore, at the reflection display time, a black-and-white display can be produced without using the colored light emitting means 103 so that it is possible to adapt the display to each of the light emitting display, the reflection display and a different display method. This is particularly suitable for a device having the above driving circuit section, which can reduce excessive power at the reflection display time and is effective to reduce power consumption.

From the above description, power consumption of the driving section 105 is greatly reduced by switching of the signal processing (switching of the display states), and the display element 101 is suitable for both the display states of the colored light emitting display and the reflection display, so that it is possible to produce a display with high contrast and light, as well as high image quality. Further, it is possible to provide a display unit with high image quality and reduced power consumption by combining these constructions.

Detailed constructions of the display element 101 and the driving section 105 and effects peculiar to these constructions, etc. will be described in detail in the following embodiments.

The same reference numerals used in each figure designate the same or corresponding objects.

(Embodiment 1)

One embodiment of the display unit in accordance with the invention will be sequentially explained with reference to FIGS. 1 to 5.

In the display unit of this embodiment, a light emitting display is performed by field sequential driving of multi-gradation color, and reflection display is performed by frame driving of a black-and-white binary display. The field sequential driving of the multi-gradation color is performed at a light emitting display time, since the light emitting display time is a time during which the display unit is used in many cases, and it is believed to improve the convenience of a user requiring the display of a larger amount of information with high image quality. The frame driving of the black-and-white binary display is performed at a reflection display time since the reflection display time is a standby time of the display unit in many cases, and it is considered to reduce power consumption while a function property of the display unit is secured. Namely, this display unit can optimize the consumed power and reduce power consumption by switching driving methods in consideration of a function (display ability, etc.) required for the user at each of the color light emitting display time and the reflection display time. In this specification, the frame driving is a driving method for changing the driving voltage of a liquid crystal for every one frame period, and this term is used to discriminate this frame driving from field sequential driving having plural subframe periods within one frame period.

Points concerning reduction in power consumption in the driving circuit section 105 (see FIG. 1) will be explained next.

As mentioned above, the driving section 105 has the signal processing switching section 106, the light source control section 111, and the signal processing sections 112, 113. In accordance with the invention, the display element 101 is set to have a display section including a display control section (a so-called scanning side driving circuit section, a signal side driving circuit section, etc.) for controlling the operation of an active matrix on an active matrix substrate. Each of the constructional elements of the driving section 105 may be arranged on the active matrix substrate of the display element 101, and may be also arranged outside the display element 101. The driving section 105 is rigidly considered as a functional set of the above constructional elements, however, there is no limit to the position in a concrete arrangement of this driving section 105.

The signal processing switching section 106 reduces power consumption by selectively using signal processing corresponding to each of the color light emitting display and the reflection display at any time. Here, we have noticed the difference between both the displays, i.e., the driving method and gradation to reduce power consumption, and the power consumption is reduced with respect to each point. This construction will be explained next.

First, a first point is to switch the driving methods, i.e., operating frequencies. The field sequential color display method is adopted in the light emitting display. Therefore, each subfield (at least three subframe periods in total) of at least the three primary colors RGB is required to perform the color light emitting display in one frame period. In contrast to this, frame driving of the black-and-white display is adopted at the reflection display time so that it is not necessary to arrange the subfield required at the color display time. Accordingly, the operating frequency at the reflection display time is reduced in comparison with the operating frequency at the color light emitting display time, and can be set to at least one-third and less. As a result, the amount of power consumption can be greatly reduced. In this case, it is sufficient to add a circuit construction (driving frequency control section) for switching frequencies of the driving section.

A second point is to reduce power consumption by a method (memory switching method) for switching gradation. As mentioned above, this is because convenience is improved by adopting a multi-gradation display at the color display time, and power consumption is reduced by adopting a binary display at the black-and-white display time. The power consumption can be reduced by setting the binary display to that of black-and-white from color multi-gradation, since the use of a digital-analog converter of relatively large power consumption required to perform the multi-gradation display is avoided. In this case, it is also useful to reduce the power consumption by bypassing a signal path (digital-analog converter) of large power consumption, and simultaneously stopping the supply of a clock to the digital-analog converter. In this case, it is also useful to use a construction for changing memories at the color light emitting display time and the reflection display time. In this embodiment, this construction is realized by providing a function for realizing a memory switching method in the signal processing switching portion 106. In this specification, this gradation switching method includes switching of an image signal and conversion of bits of the image signal. This method will be also described later.

In a separate view of the second point, at a normal time, i.e., when the light emitting display is selected, the display of a high bit number (n-bits) is performed. In contrast to this, when the reflection display is selected by commands of a user, etc., an image signal for the reflection display suitable for low power consumption is separately regenerated, and the display of a low bit number (m-bits n>m) is performed so that the power consumption is reduced.

A technique for reducing the power consumption will be explained next together with a concrete example.

Figure 2:
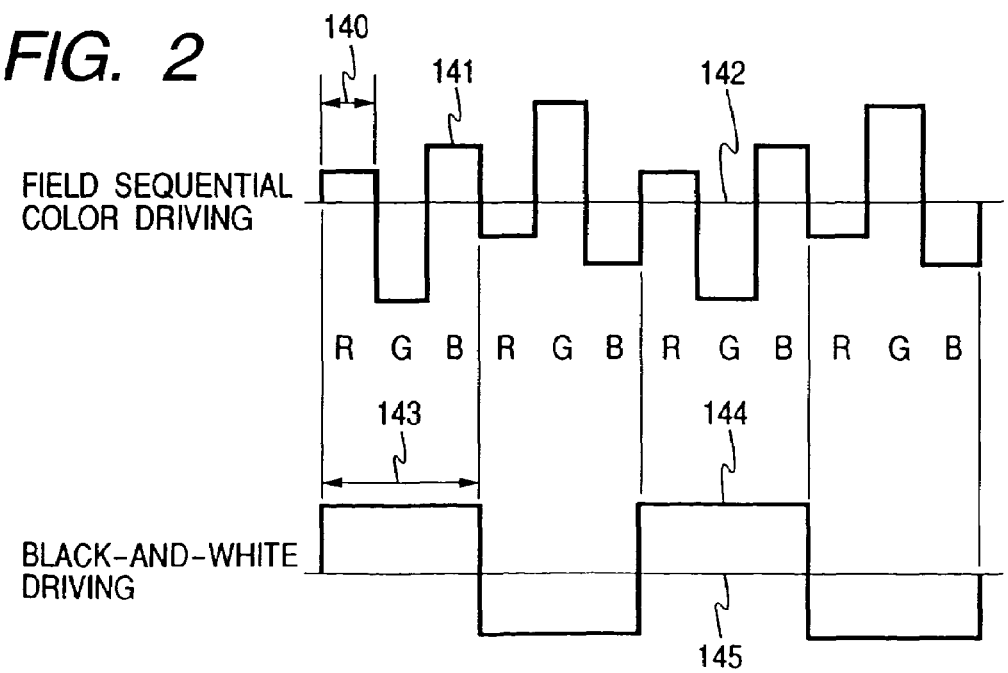
FIG. 2 is a waveform timing diagram showing a difference in driving method between a field sequential color display and a black-and-white display.

FIG. 2 is an explanatory view which illustrates the reduction in power consumption using switching of operating frequencies at the above first point.

In each of upper and lower waveforms of FIG. 2, the abscissa shows time, and the ordinate shows a voltage value applied to a pixel electrode. The upper waveform shows a voltage waveform applied at the field sequential color driving time, and the lower waveform shows a voltage waveform applied at the black-and-white frame driving time.

In the application voltage waveform 141 of the field sequential color driving, one frame period 143 includes three subframe periods 140. In each of these subframe periods 140, the application voltage corresponding to each of the three primary colors RGB is applied to the pixel electrode. Since the three primary colors RGB corresponding to the application voltage are switched in an order of RGB every subframe period, an observer recognizes this switching as a color display. In this figure, one frame period includes the three subframe periods. Therefore, for example, when the frame frequency is set to 60 Hz, it is necessary to set the subframe frequency, i.e., operating frequency to 180 Hz.

In contrast to this, in the application voltage waveform 144 of the frame driving, no subframe period exists within one frame period 143. Accordingly, similar to the above case, no subframe period exists even when the frame frequency is set to 60 Hz. Therefore, the frame frequency of 60 Hz is set to the operating frequency as it is.

This display unit notices a difference in operating frequency at the above field sequential color driving time and the frame driving time, and switches the operating frequency at the frame driving time to one-third of the operating frequency at the field sequential color display time. Thus, power consumption can be reduced by the difference in operating frequency. This construction can be realized by providing an operating frequency control section for switching the frequency of a dot clock for controlling a time interval of data transfer to a pixel in accordance with a display mode within e.g., the driving section, a control section of an entire device, etc. At the black-and-white frame display time, i.e., the reflection display time, the power consumption is also reduced by turning-off the light source.

In FIG. 2, the voltage polarity of the application voltage of the field sequential color driving is inverted with respect to a central electric potential for every one subframe period, but it also can be inverted every one frame period. Further, the number of subframes constituting one frame is not limited to three. This is because the object is to reduce power consumption by the difference in frequency.

Figure 3:
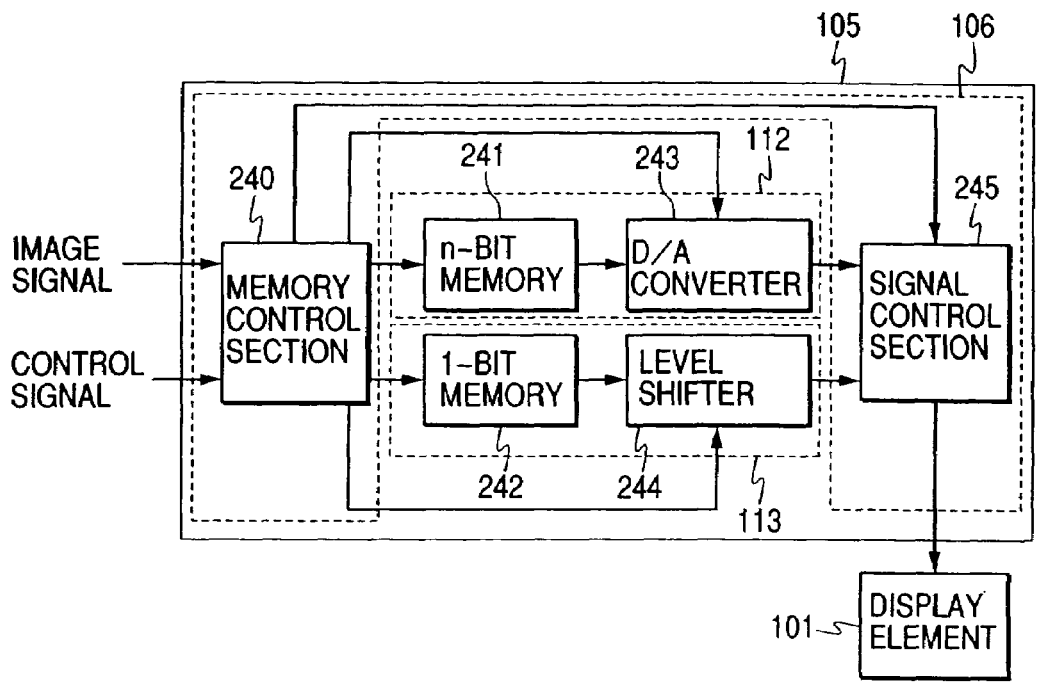
FIG. 3 is a block diagram of a D/A converter switching means.

FIG. 3 is a view which will be referred to for explaining a method of reducing power consumption by setting the black-and-white display at the reflection display time to a binary display in accordance with the above second point, i.e., a method of reducing power consumption by switching use and non-use of a circuit block of relatively large power consumption, such as a digital-analog converter, etc. In FIG. 2, the color multi-gradation display is performed by n-bit display, and the black-and-white display is performed by two-gradation display of 1-bit display.

FIG. 3 is a view showing the driving section 105 within the display unit. The driving section 105 has a signal processing switching section 106 having a memory control section 240 and a signal control section 245, a first signal processing section 112, and a second signal processing section 113.

The first signal processing circuit section 112 has an n-bit memory 241 and a digital/analog converter 243. The second signal processing circuit section 113 has a 1-bit memory 242 and a level shifter 244. The n-bit memory 241 and the 1-bit memory 242 are arranged independently and have a function for holding image signals for the color display and the black-and-white display.

The memory control section 240 is connected to at least the D/A converter 243, the level shifter 244, the signal control section 245, the 1-bit memory 241 and the n-bit memory 242, and performs a control operation such as the writing of an image signal, etc. by selecting one of the memories in accordance with a control signal. For example, the control signal includes instructions for controlling one of the color display and the black-and-white display, etc. In this embodiment, this image signal is a digital signal. An image signal of n-bits is transmitted in the color multi-gradation display, and an image signal of one bit is transmitted in the black-and-white display (for example, a control section of the entire device if it is a portable device, etc.). In this case, the switching operation may be performed by judging the number of bits of the image signal using the memory control circuit section. In this case, it can be also constructed such that the image signal is also a control signal.

In the above description, the driving section 105 selects a display path according to the transmitted image signal and the control signal.

An operation and effects of the signal processing switching section 106 in FIG. 3 will be explained next.

When the memory control section 240 selects the n-bit memory 241 using the control signal transmitted from the outside, the image signal is stored in the n-bit memory 241 and is then converted to an analog signal by the D/A converter 243. An image is then displayed in the display element 101 through the signal control section 245 and the driving interface 107. In contrast to this, when the memory control section 240 selects the 1-bit memory 242, the image signal is stored in the 1-bit memory 242 and is then converted to a binary analog signal by the level shifter 244. An image is then displayed in the display element 101 through the signal control section 245 and the driving interface 107.

In this embodiment, a combination using both the image signals of the n-bit gradation and the 1-bit gradation is adopted as the image signal transmitted from the outside. However, the image signal of only the n-bit gradation is also possible. In this case, a section (bit converting section) for converting n-bits to one bit is added to the memory control section 240 or the signal processing section 113. This bit converting circuit section may be also arranged before or after the memory control section. When the bit converting circuit section is arranged after the memory control section, this bit converting circuit section may be arranged before the 1-bit memory. In contrast to this, when the bit converting circuit section is arranged before the memory control section, the memory control section 240 has this function. A concrete example of the case of generating a signal from n-bits to one bit will be described later.

As mentioned above, it is possible to bypass the D/A converter 243 of large power consumption by using a construction in which both the n-bit gradation display and the 1-bit gradation display (binary display) are provided, and in which the D/A converter 243 and the level shifter 244 are selected. Namely, power consumption can be greatly reduced at the one-bit gradation display (binary display) time. This is particularly effective in a situation in which low power consumption is important at a standby time in a portable phone using the display unit.

In this embodiment, the n-bit multi-gradation color display is performed at the time of using the D/A converter, and the one-bit black-and-white display is performed by two gradations of one bit at the time of using the level shifter, for example. However, the display unit also may be constructed such that the color display at the time of using the D/A converter can be performed by the multi-gradation of n-bits, and the display at the time of using the level shifter can be set to the color display (eight-color display) of 1-bit gradation in which the 1-bit memory is arranged for each of the three primary colors. This construction is suitable for a case in which only character information is displayed in color in a portable phone using this display unit, etc. This construction is also effective to reduce power consumption.

Otherwise, the display unit also may be constructed such that black-and-white display is performed by n-bit gradation. This has an effect of a reduction in power consumption when a natural image is displayed in gray scale. This construction can be realized by providing a circuit portion for converting a color image signal to a black-and-white image signal. Concretely, each of color multi-gradation display, color 1-bit gradation display, black-and-white (monochromatic) multi-gradation display and black-and-white (monochromatic) 1-bit display can be performed by the construction provided in accordance with the invention.

Figure 4:
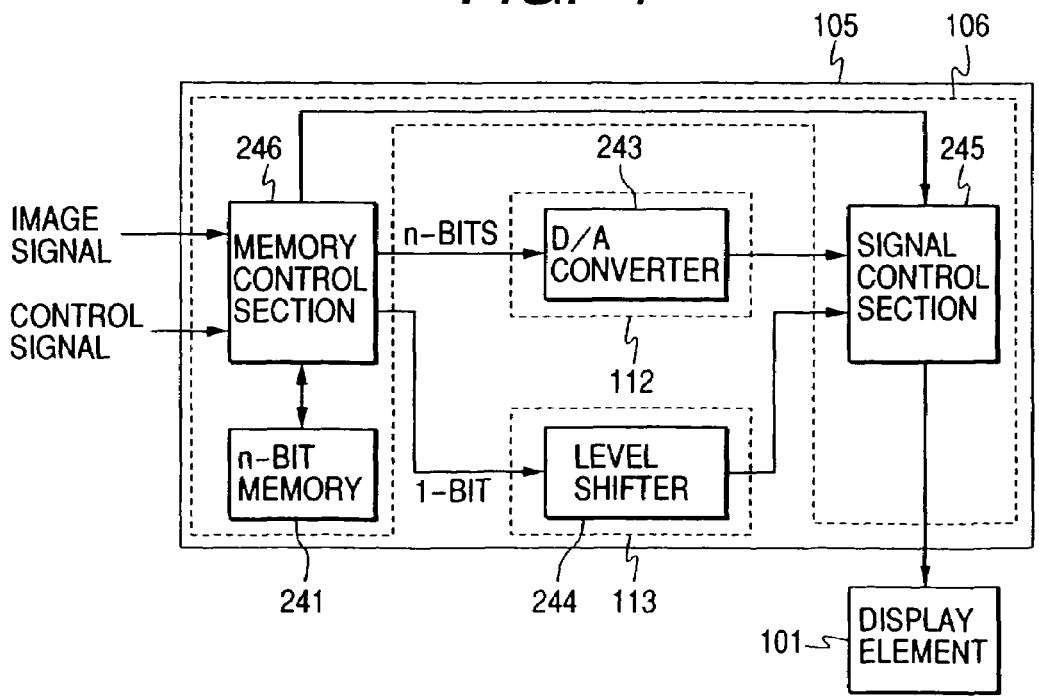
FIG. 4 is a block diagram of a gradation bit switching means.

The arrangement and construction of the entire circuit is not limited to that shown in FIG. 3, but a construction as shown in FIG. 4 also can be used. This construction will be explained next. The difference in construction between FIGS. 3 and 4 is that the n-bit memory 241 also can be used in the case of 1-bit gradation display. In a concrete construction, the n-bit memory 241 of one kind is adopted as a memory and is arranged independently of the D/A converter 243 and the level shifter 244.

The operation and effects of the display unit shown in FIG. 4 will be explained. A memory control section 246 stores a supplied image signal to a necessary area of the n-bit memory 241 in accordance with a control signal. The image signal supplied to the memory control section 246 in this example is set to a combination of an n-bit gradation signal and a 1-bit gradation signal. When the n-bit gradation display is performed, the n-bit gradation signal is supplied to the D/A converter 243. In contrast to this, when the 1-bit gradation display is performed, the 1-bit gradation signal is supplied to the level shifter 244. The D/A converter 243 generates an image signal of analog gradation, and the level shifter 244 generates an image signal of binary gradation. One of the image signals generated through the signal control section 245 is supplied to the display element 101. In view of the consumed power, it is desirable to construct the display unit such that a clock is supplied to only one of the D/A converter 243 and the level shifter 244 depending on whether n-bit gradation display or 1-bit gradation display is to be performed.

As mentioned above, it is also possible to use a construction in which the image signal inputted from the exterior of the driving section 105 is set to n-bits at any time, and a circuit section (bit converting section) for converting the image signal to one bit is arranged before the memory control section 246, and a construction in which the bit converting section is arranged between the memory control section and the level shifter.

Figure 5:
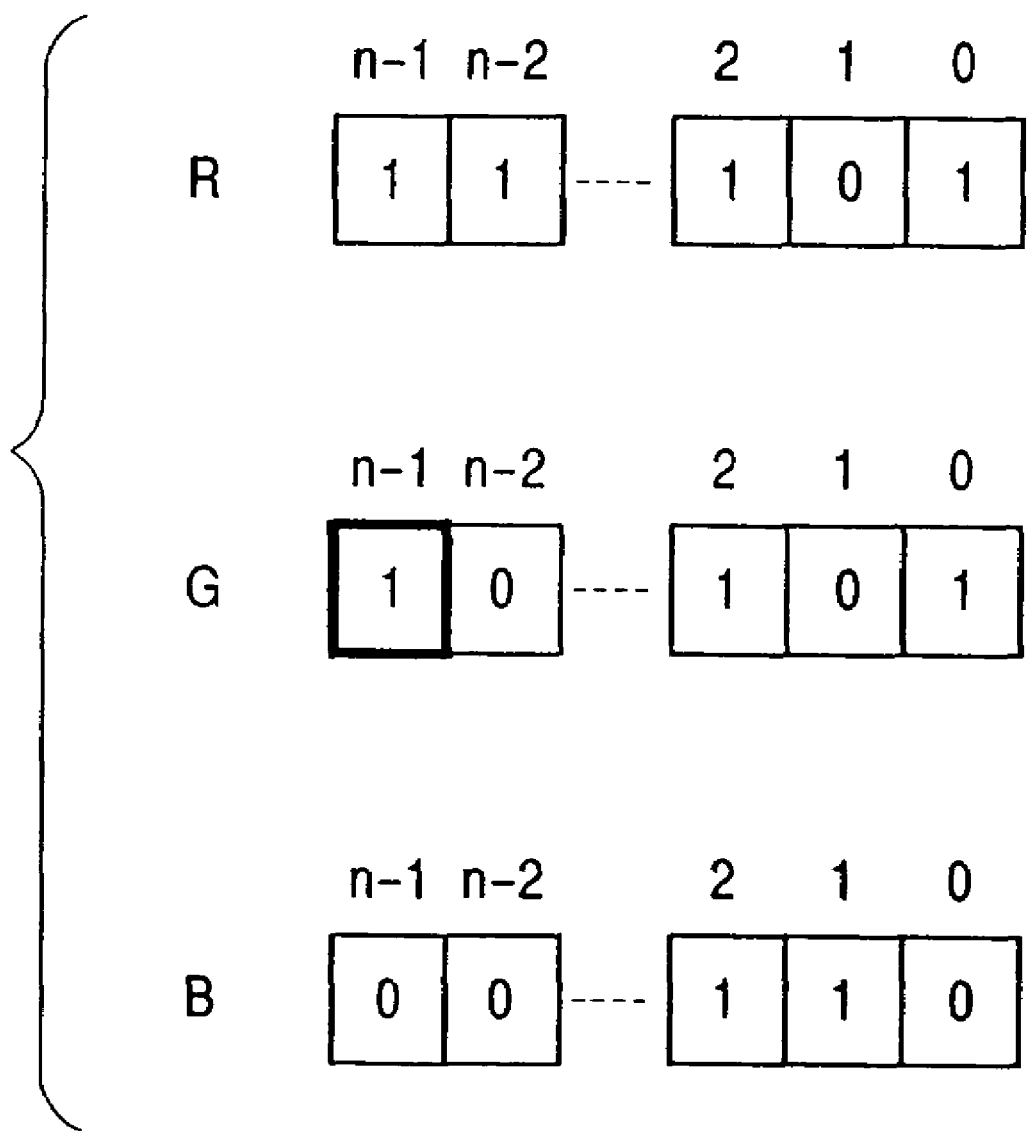
FIG. 5 is a diagram showing an example in which 1-bit image data are generated from n-bit image data.

FIG. 5 shows one example of a memory allocating method when the above bit converting section performs 1-bit gradation display by using an n-bit signal. In FIG. 5, a value surrounded by a heavy line at the position (n−1) in the memory for data representing green (G) shows an image signal in the two-gradation display.

For example, only the memory for green among memories for the three primary colors RGB is used by this memory allocating method, and the display of two gradations can be performed by using the value of a most significant bit of this memory. When the color image signal is constructed of n-bits, an image signal of one bit for the monochromatic two-gradation display can be generated.

Figure 6A:
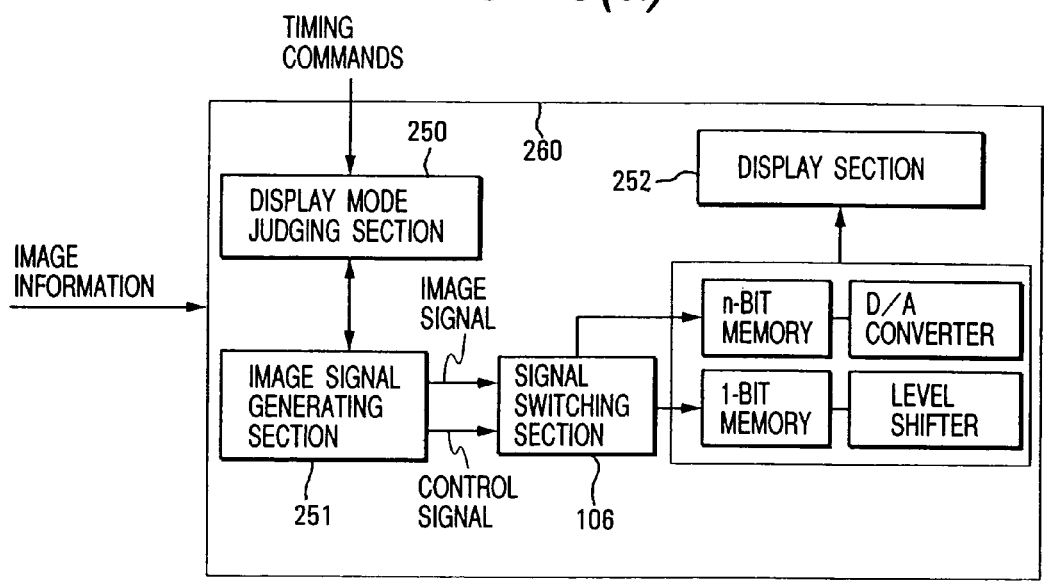
FIGS. 6(a) and 6(b) are block diagrams illustrating overall signal processing in a portable information terminal.
Figure 6B:
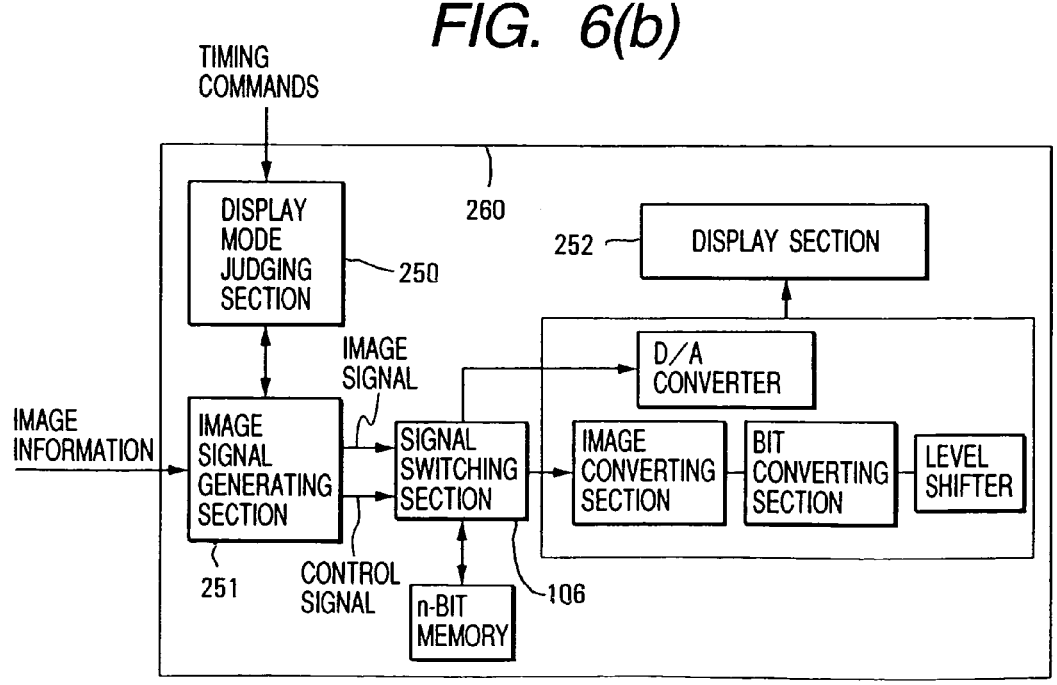

FIGS. 6(a) and 6(b) systematically show examples of an entire flow of signal processing in a portable information terminal by including the judgment of a display mode, the generation of an image signal and transmission processing.

The portable information terminal 260 of FIG. 6(a) has at least a display mode judging section 250, a signal generating section 251, a signal processing switching section 106, at least an n-bit memory, a first signal processing section having a digital-analog converter connected to the n-bit memory, at least a 1-bit memory, a second signal processing section having a level shifter connected to the 1-bit memory, and a display section 252 (corresponding to e.g., a liquid crystal cell 101) for displaying an image. It is proposed, as an example of concrete constructions of the signal generating section and the display mode judging section, that a CPU having a function of both the signal generating section and the display mode judging section is provided, and the display mode judging section and the image signal generating section are arranged in software (a program for controlling the operation of a device) of the CPU. Otherwise, it is also proposed in the above example that the display mode judging section and the image signal generating section are provided as a system LSI including the CPU. It is further proposed in the above example that the CPU is the signal generating section, and the circuit section for display mode judgment is separately provided, etc.

In FIG. 6(a), the first and second signal processing sections are separately arranged, but may be combined with each other as a single signal processing section, and two processing paths may be arranged within this signal processing section, as mentioned above. Further, a signal processing switching section also can be included in the signal switching section of FIG. 6(a) or FIG. 6(b). The following construction also can be applied to the construction shown in FIG. 4.

The display mode of FIGS. 6(a) and 6(b) is set to have color multi-gradation (n-bit gradation) and monochromatic two gradations (1-bit gradation). However, the above low light emitting mode also can be added to this mode. A monochromatic signal may be set to gradation of n-bits. In this case, it is necessary to arrange a bit converting section before the level shifter or the 1-bit memory.

A processing flow in FIG. 6(a) will be explained first. First, the display mode judging section 250 judges the display mode (display state) in the display section in response to a button operation by a user and commands of a markup language, and sends judging commands to the image signal generating section. Thereafter, the image signal generating section generates an image signal corresponding to the display mode of the display section based on information transmitted from a wireless portion, etc., and a control signal for controlling an operation of the signal processing switching section, and transmits the generated signals to the signal processing switching means. Each of the generated signals is an n-bit signal for color in the case of the color multi-gradation, and is a 1-bit signal for monochromatic display in the case of the monochromatic two gradations. The signal processing switching section, upon receiving the image signal and the control signal, selectively switches a path of signal processing, i.e., one of the first and second signal processing sections. The above selected signal processing section performs processing for converting the image signal to an analog signal, etc. Thereafter, the display section 152 displays an image by receiving the image signal.

Thus, the display mode of the image can be arbitrarily switched, and convenience can be improved and power consumption can be reduced.

Switching timing of the display mode judged by the display mode judging section is not limited to the user's operation and the markup language, but timing in application, etc. is also considered as mentioned above. The display mode judging section 250 transmits commands to the signal generating section, but the signal generating section also recognizes a judgment of the display mode judging section, and information transmitting direction is not limited to one direction.

The signal generating section produces the image signal and the control signal, but information of the control signal can be included in the image signal as mentioned above. For example, an operation such as a switching operation performed by recognizing the bit of an image, is possible. An operation such as an operation for reconverting a bit made by the signal generating section in accordance with the display mode, etc. is performed in this case.

Further, it is proposed that switching instructions are directly transmitted to the signal processing switching section while the display mode judging section transmits instructions to the signal generating section and an image signal corresponding to the display mode is generated. It is also proposed that the image signal is generated irrespective of the display mode, but the display mode judging section judges the display mode of the display section and directly transmits instructions to the signal processing switching circuit section. This construction is effective when the signal switching and the image signal generation are independently performed.

FIG. 6(b) will be explained next. The difference between FIGS. 6(a) and 6(b) is that the driving section has the construction of FIG. 4, and the display mode judging section 250 directly transmits instructions to the signal switching section without transmitting instructions to the signal generating section. The processing flow will be described next.

First, the display mode judging section 250 judges the display mode (display state) in the display section in response to the button operation of a user and commands of the markup language, and transmits judging commands to the signal processing switching section. The signal processing switching section temporarily stores a transmitted image signal to the n-bit memory, and then it transmits the image signal to a selected one of the first and second signal processing sections. In this case, when the signal switching section selects the level shifter side, it is sufficient to arrange a bit converting section and an image converting section for converting the image signal for color to an image signal for monochromatic display, and the arrangement order of the bit converting section and the image converting section is not limited. For example, this processing is performed by the processing explained with reference to FIG. 5. The above selected signal processing section performs processing such as conversion from the image signal to an analog signal, etc. Thereafter, the display section 152 displays an image based on the image signal. Thus, the image in an arbitrary display mode can be displayed even when the signal generating section generates an image signal corresponding to the same display mode at any time. Accordingly, convenience can be improved and power consumption can be reduced.

Further, the driving circuit section 105 in this display unit also controls the operation of a backlight as a light emitting means, and the power consumption is also reduced in view of this backlight control. This display unit will next be explained with reference to FIGS. 7(a) to 7(c) and FIGS. 8(a) and 8(b).

FIGS. 7(a) to 7(c) show the relation of a scanning period, a liquid crystal response period and a light source lighting period in an arbitrary subframe at a field sequential color display time, respectively. In FIGS. 7(a) to 7(c), the axis of abscissa shows time in each of waveforms. In this figure, a display element having m-gate lines and n-signal lines in the display section is presented as a concrete example. In this specification, scanning lines, signal lines, and a scanning circuit section and a signal circuit section for controlling operations of these scanning and signal lines are set to be arranged within the display section, and an image is displayed in the display section through a signal transmitted by the driving interface 107.

FIG. 7(a) is a view showing timing of gate selection pulses from a first gate line to an m-th gate line (k=1 to m). In this figure, reference numeral 150 designates a gate selection pulse.

A waveform 151 of FIG. 7(b) is shown in accordance with a gate line of FIG. 7(a). The respective waveforms show response waveforms of liquid crystal molecules in pixels corresponding to a k-th gate line (k=1 to m) and an m-th signal line (final line).

A waveform 152 of FIG. 7(c) is a waveform showing lighting timing of the light source, and the ordinate shows light intensity. The lighting of the light source is controlled by a light source control section in the driving section. For example, an operation of the light source control section is controlled by the signal processing switching section receiving the control signal.

One subframe period includes three periods of a scanning period required to scan m-gate lines, a liquid crystal response period required to produce a sufficient response of the liquid crystal, and a light source lighting period for lighting the light source. Luminance depends on the intensity of transmitted light and the lighting time. Therefore, if the light intensity is the same, a brighter display state can be obtained as the light source lighting period becomes longer. However, the light source lighting period is determined by subtracting the scanning period and the liquid crystal response period from one subframe period.

The liquid crystal response period is set to prevent a deterioration in image quality due to luminance irregularities of a pixel. When no liquid crystal response period is set, light is immediately emitted from the light source after the scanning period. However, no response of the liquid crystal is yet stabilized in a lower portion (near K=m) of a display area. Therefore, no desirable luminance can be obtained even when light is transmitted through this lower portion. As a result, a deterioration in image quality is caused.

The scanning period is set since there is a time difference between a time point for selecting a first gate line and a time point for selecting an m-th gate line. When no scanning period is set, a luminance difference is caused by lighting the light source in the scanning period between upper and lower portions (k=1 and m) of the display area even when the response time of the liquid crystal is a negligible short time. Therefore, a deterioration in image quality is caused.

Accordingly, it is necessary to set the scanning period and the liquid crystal response period, and to light the light source after the liquid crystal of the m-th line makes a sufficient response.

As shown in FIG. 7(a), the scanning period is about one-third of the subframe period. Therefore, it is also useful to further reduce power consumption by stopping the supply of a clock signal to a display driver between the liquid crystal response period and the light source lighting period.

Figure 8A:
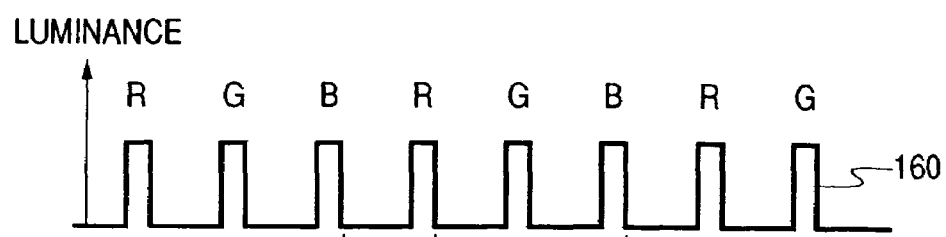
FIGS. 8(a) and 8(b) are diagrams showing a change in the light emitting intensity of a light source with the passage of time.
Figure 8B:
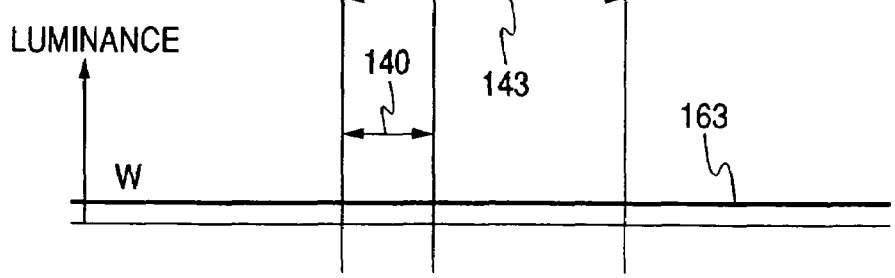

FIGS. 8(a) and 8(b) show a change in light emitting intensity of the light source with the passage of time in each display mode. FIG. 8(a) shows a change in time of the light emitting intensity in the field sequential color display. FIG. 8(b) shows a change in time of the light emitting intensity in low light emitting display. FIGS. 8(a) and 8(b) illustrate a power consumption method in the low light emitting display.

FIG. 8(a) shows an example in which the field sequential color display is performed. In FIG. 8(a), the abscissa shows time and the ordinate shows luminance. When field sequential color display is performed, one of the light sources of the three primary colors (RGB) is sequentially lighted at least one time in a pulse shape every subframe period 140 in one frame period 143. Accordingly, the permutation of a monochromatic light pulse is formed within one frame period 143 in a time arrangement of the light pulses of the three primary colors. In this embodiment, the subframe periods of the three primary colors are arranged in an order of red, green and blue so that the light sources are also correspondingly sequentially lighted in the order of red, green and blue. The subframe order may be replaced and set to an order of red, blue and green, etc. In this case, the lighting order of the light sources is also correspondingly replaced. The number of subframe periods existing within one frame period also can be changed.

FIG. 8(b) shows a case in which the low light emitting display is performed. In this figure, the abscissa shows time and the ordinate shows luminance. In this specification, the low light emitting display shows a third display system in accordance with the invention, and it shows an intermediate display mode between a display method for performing light emitting display by turning-on the light source and a display method for performing reflection display by turning-off the light source. Namely, this display mode shows black-and-white or monochromatic display, and light emitting display, although the luminance is low. The light sources of the three primary colors are simultaneously lighted and are used as a white light source (W), and light (continuous light 163) continuous in time is used as light emitted from the light source. The light intensity is set to be lower than that at the color display time to reduce the power consumption.

This display mode can be easily realized by separately and independently on/off switching the light source and the driving method.

This display mode has advantages in that the power consumption is reduced by reducing the frequency to a frequency corresponding to frame driving, and the power amount of the light source can be reduced by reducing the light source intensity. Namely, the light emitting display of low power consumption can be performed in comparison with a case in which the field sequential color light emitting display is performed. This is particularly effective for use over a long time in a dark place, and is effective to improve convenience as a portable device. FIG. 8(b) shows an example of the black-and-white display in which all the red, green and blue colors are lighted. However, it is also possible to perform monochromatic display in which only two or one color among the red, green and blue colors is lighted. Control for increasing the light source intensity under a light environment and decreasing the light source intensity under a dark room environment may be also used by arranging a sensor for monitoring the intensity of the environmental light. Thus, it is possible to prevent a reduction in color purity caused by superposing the luminance of external light on the luminance of the light source under the light environment. Further, power consumption can be reduced while a sufficient visual recognizing property is obtained under the dark room environment. Further, it is useful to arrange a temperature monitor and control frame frequency in accordance with temperature, and switch the color light emitting display to the reflection display. This is because the liquid crystal response speed is reduced under an environment at a low temperature, such as a below-zero temperature, so that the possibility of a reduction in color reproducibility is caused. Thus, the frame frequency can be set to be low under the low temperature environment so that an influence on image quality due to the reduction in liquid crystal response speed can be prevented. Further, it is particularly useful to suitably replace the sequential time order of subframes for every color and every frame under the low temperature environment. Thus, it is possible to prevent a color imbalance caused by a reduction in liquid crystal response speed under a low temperature environment. Otherwise, the display unit may be also constructed such that the color display is compulsorily switched to the black-and-white or monochromatic display at a temperature equal to or lower than a constant temperature.

In the field sequential color driving used in this embodiment, the light source is lighted in a pulse shape so as to increase the display luminance so that it is necessary to set the peak power to be very high. Therefore, it is useful to arrange a precharge circuit for lighting the light source in a pulse shape by continuous power in a light source control section of the driving section 105. A charge pump operation is performed by an action of this precharge circuit, and it is possible to prevent a sudden load due to generation of the peak power from being applied to a storage battery. Thus, wearing of the storage battery is reduced, and the life time of a device can be lengthened.

Further, when a point light source such as an LED, etc. is used, an incident light ratio can be improved by forming a notch in an incident portion of light emitted from the LED in a light guide body. A widening angle of emitted light can be widened by forming a cylindrical lens on an emitting face of the LED, and uniformity of illumination can be improved. If the above light emission can be performed, a fluorescent tube of each of the three primary colors RGB, etc. also can be used.

As explained above, the unnecessary case of power can be reduced at the reflection display time and power consumption can be greatly reduced by arranging the driving section 105, having the signal processing sections 112, 113, and the signal processing switching means 106 in the display unit.

The display element 101 in this embodiment will be explained next.

As mentioned above, one of the features of this display unit is that the driving section 105 having a switching means operating in accordance with the signal processing method is arranged to reduce power consumption. However, since plural display states are set by switching the signal processing section, it is necessary to devise the display element 101 in accordance with each of the display states. Accordingly, the display element corresponding to both the display states of the light emitting display and the reflection display and which can improve image quality will be explained next.

Figure 9A:
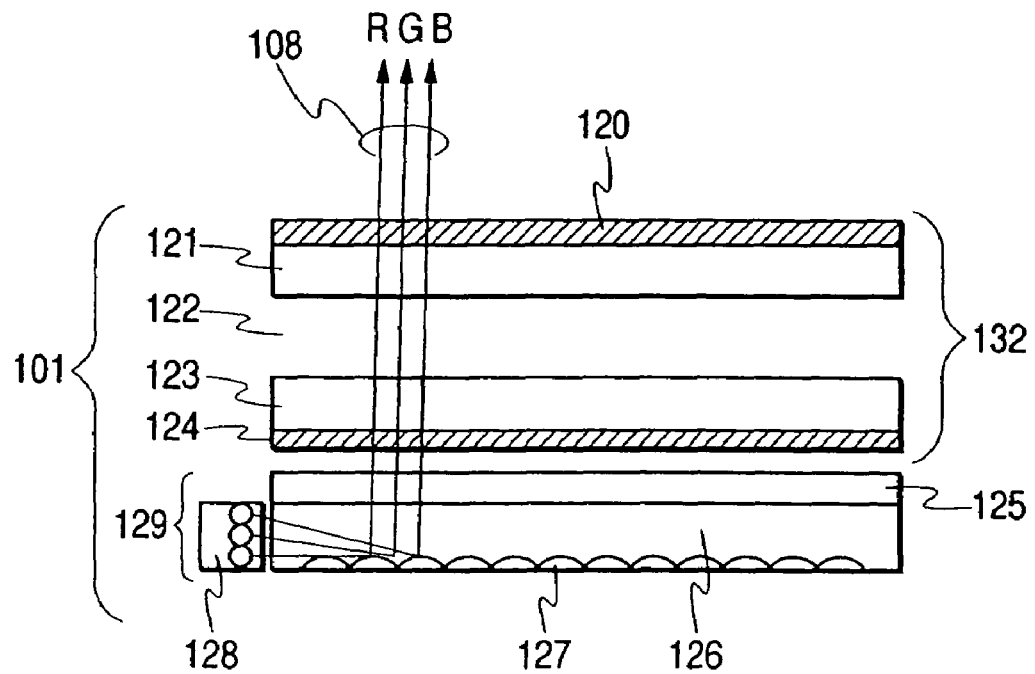
FIGS. 9(a) and 9(b) are cross-sectional views of a display unit in an embodiment 1 of the invention.
Figure 9B:
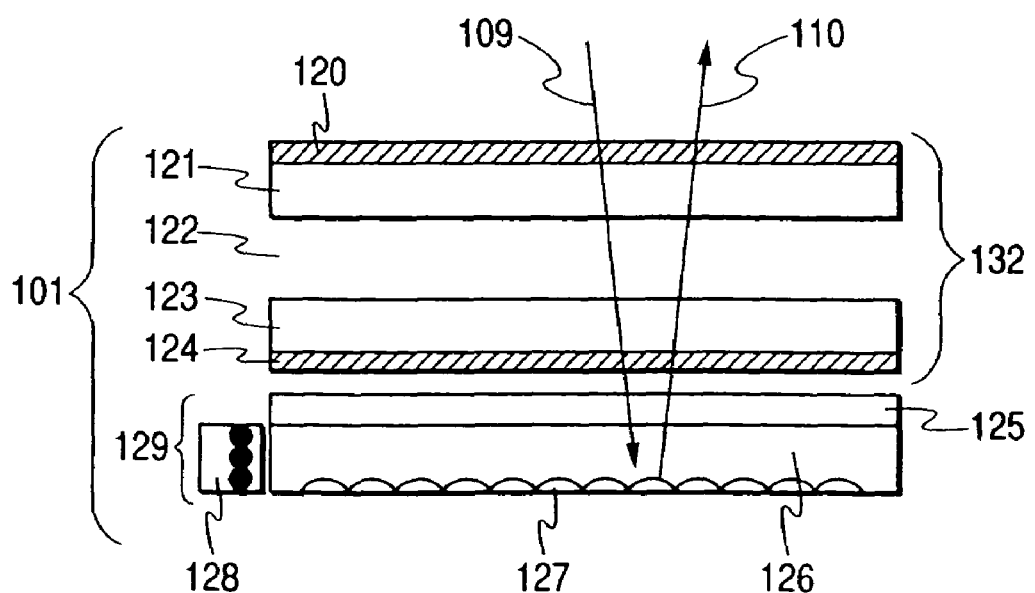

FIGS. 9(a) and 9(b) are cross-sectional views of the display element 101 in the display element of this embodiment. FIG. 9(a) shows the display element 101 at the color light emitting display time, and FIG. 9(b) shows the display element 101 at the reflection display time. The display element 101 is constructed by including a liquid crystal cell 132 and a backlight 129. The liquid crystal cell 132 corresponds to the light polarizing state modulating means 102 in FIG. 1, and the backlight 129 corresponds to the color light emitting means 103 and the external light reflecting means 104 in FIG. 1.

A structure of the liquid crystal cell 132 in FIGS. 9(a) and 9(b) will be explained first.

The liquid crystal cell 132 is constructed by including a first light polarizing plate 120, a transparent substrate 121 having a transparent electrode, etc., a liquid crystal layer 122, an active matrix substrate 123 having an active matrix for operating the liquid crystal layer, and a second light polarizing plate 124.

A twist nematic mode for setting a twist angle to 90 degrees is adopted in the liquid crystal layer 122. An orientation film for orientating the liquid crystal is formed on liquid crystal layer contact sides of the transparent substrate 121 and the active matrix substrate 123, although this construction is omitted in FIGS. 9(a) and 9(b). Further, the cell gap, which is the distance between the transparent substrate 121 and the active matrix substrate 123, is set to 2 µm in consideration of high speed response of the liquid crystal. If the field sequential color display can be performed, another display mode can be also applied naturally. When the display element is used in a portable information terminal, there are many cases in which this display unit is seen from a lower side. Therefore, an angle of visual field is symmetrically set on left-hand and right-hand sides, and is set to be wide from the lower side, and is set to be narrow on an upper side so that convenience is usefully improved. These constructions can be adjusted by the rubbing angle.

The active matrix substrate 123 has a display portion in which pixels are arranged in a matrix shape. A transistor as an active element is arranged in each pixel. In this display element, a transistor using amorphous silicon is used as one example, but any one of amorphous silicon, polycrystal silicon and monocrystal silicon may be also used as a semiconductor material forming an active element such as a transistor, etc. When amorphous silicon and polycrystal silicon are used, a glass substrate is normally used. Accordingly, in this embodiment, the glass substrate is used as the active matrix substrate 123. As a method of production of the active matrix substrate, there are a method for arranging the active element in an epitaxial growing layer of monocrystal silicon formed on the glass substrate, and a method in which an active matrix circuit structure formed on a monocrystal silicon substrate in advance is separated by a lift-off method and is stuck onto the glass substrate.

Next, the backlight 129 (corresponding to the colored light emitting means 103 and the external light reflecting means 104 in FIG. 1) in FIGS. 9(a) and 9(b) will be explained. The backlight 129 in the embodiment 1 has both a function for guiding light from a white LED as a light source to the liquid crystal cell 132 by scattering this light, and a function as a reflection plate for reflecting external light 109 incident through the liquid crystal cell 132.

The backlight 129 sequentially has a light polarizing maintaining type scattering layer 125, a light guide body 126 and a light polarizing maintaining scattering reflection plate 127 on one side of the liquid crystal cell 132. The backlight 129 is constructed by arranging a white LED 128 which can perform field sequential lighting of the three primary colors on a side face of the light guide body 126. The light polarizing maintaining scattering layer 125 has a function for scattering transmitted light, but approximately maintaining a light polarizing state before and after the transmission. The light polarizing maintaining scattering layer 125 may be basically constructed by a layer in which the light absorption in the entire visible ray range is very small, and the refractive index is slightly changed in an order approximately equal to or smaller than a wavelength of light on a layer face in a thickness direction, and has a distribution. For example, it is possible to apply a film formed by dispersing particles of a material slightly different in refractive index from a medium into a polymer film and resin, a hologram made by using a photosensitive material to an ultraviolet ray, etc., a layer using a material formed by dispersing particulates of a material slightly different in refractive index from an adhesive into resin such as an adhesive, a prism sheet having a scattering property, etc. When the prism sheet is applied, the prism sheet can function as a reflection plate for reflection of external light. The light polarizing maintaining type scattering reflection plate 127 has a function for reflecting and scattering light, but approximately maintaining a light polarizing state before and after the reflection. In a structure of the light polarizing maintaining type scattering reflection plate 127, for example, fine irregular faces are formed on the surface of a light guide body, and a high reflectivity metallic plate of aluminum, etc. is formed by an evaporation method, sputtering method, etc. It is useful in obtaining uniformity of luminance to provide a distribution on a face with respect to the above fine irregular shape, and it is particularly useful to make emitted light 108 from the light source arranged on a side face uniformly incident onto the liquid crystal cell 132. As another constructional example of the light polarizing maintaining scattering reflection plate 127, there is an embodiment in which the light guide body 126 and the reflection plate are adhered to each other by an adhesive, and particles of resin, glass, etc. slightly different in refractive index from the adhesive are dispersed into the adhesive. Further, it is also possible to provide a polymer type liquid crystal layer disposed between transparent electrodes, in which a scattering state and a transmitting state are switched by electric control, and the scattering state is set at the color light emitting display time, and the transmitting state is set at the reflection display time. In this case, a reduction in color purity caused by superposing white external light can be prevented, and it is particularly effective during use under a bright environment, such as outdoors, etc.

The above light polarizing maintaining scattering layer 125 and the light polarizing maintaining type scattering reflection plate 127 may be arranged as one portion of the light guide body, as mentioned above, and it may be also arranged as a layer separated from the light guide body. This is because the objective in this arrangement is to maintain the light polarizing states of incident light and reflected light.

When a point light source such as an LED, etc. is used, the light polarizing state is maintained in the light guide body itself, and it is further preferable to use a light guide body having a scattering property. In this case, an effect of making a locus of light inconspicuous is obtained. It is considered that a construction for providing the scattering property is similar to that of the light polarizing maintaining scattering layer 125. However, it is necessary to set the scattering property of the light guide body to be weaker than that of the light polarizing maintaining scattering layer so as to maintain a light guide property of the light guide body. For example, it is necessary to devise the light guide body such that the density of particles dispersed into the above resin is reduced, etc. In this case, the light guide body may be considered to be a second light polarizing maintaining scattering layer, and the light scattering property can be provided by forming a groove on an entire lower face of this light guide body. Further, when this groove is formed in a prismatic shape, the light guide body can function as a reflection plate for reflection of external light.

Operations and effects of the display element in the embodiment 1 at the color light emitting display time and the reflection display time will be explained next.

First, the display element at the color light emitting display time in FIG. 9(*a*) will be explained.

An LED of each of the red, green and blue colors provided in the white LED 128 as a light source is sequentially lighted in time, and emitted light 108 is incident on the light guide body 126. The incident emitted light 108 is scattered and reflected on the light polarizing maintaining type scattering reflection plate 127 and the light polarizing maintaining type scattering layer 125, and is uniformly irradiated to the entire liquid crystal cell 132. The display section in the liquid crystal cell 132 synchronizes image information every color with the emitted light 108 of each of the red, green and blue colors emitted from the above white LED 128, and displays an image in the field sequential system. The emitted light 108 transmitted through the liquid crystal cell is shifted in time in each of the red, green and blue colors, and is emitted in monochromatic color. However, an observer recognizes this emitted light as a color image due to the afterimage effects of the eyes. This state is represented as the color light emitting display. In the embodiment 1, a diffusion means and a diffusion reflection means are arranged such that the light guide body 126 is nipped. Therefore, the emitted light 108 can be approximately uniformly incident on the liquid crystal cell 132 at any time. Further, since no color filter is used, high light utilization efficiency can be obtained.

The display element at the reflection display time in FIG. 9(*b*) will be explained next. Since no display element in the embodiment 1 has a color filter, the black-and-white display is set at the reflection display time.

In the black-and-white display, no white LED 128 is lighted, and external light 109 is used as the light source. The external light 109 is sequentially transmitted through the liquid crystal cell 132 and the light polarizing maintaining scattering layer 125, and is reflected on the light polarizing maintaining scattering reflection plate 127 arranged in the light guide body 126. The external light 109 is again transmitted through the light polarizing maintaining scattering layer 125, and is modulated in luminance by the liquid crystal cell 132. Thereafter, the external light 109 is recognized as image information in an observer's eyes.

In the embodiment 1, the light polarizing state is maintained by arranging the light polarizing maintaining scattering layer 125 and the light polarizing maintaining scattering reflection plate 127 to brightly hold the reflection display. This feature will be explained next.

First, the external light 109 used as a light source is transmitted through first and second light polarizing plates 120, 124 of the liquid crystal cell 132. In this case, the external light 109 is absorbed by the first light polarizing plate 120, modulated by a liquid crystal layer 233, and absorbed by the second light polarizing plate 124 so that the external light 109 attains a light polarizing state. The external light 109 in the light polarizing state is then diffused and reflected on the light polarizing maintaining scattering layer 125 and the light polarizing maintaining scattering reflection plate 127. The external light 109 is again incident on the liquid crystal cell 132 so that image information is obtained. However, in a case in which no light polarizing state (in an axial direction of a second polarizer 124 through which the reflected light is easily transmitted) is maintained when the reflected light 110 is again incident on the liquid crystal cell 132, a light polarizing component shifted from a light polarizing direction is produced. Therefore, this shifted light polarizing component is again absorbed by the second light polarizing plate 124 of the liquid crystal cell 132 so that brightness is lost by this absorption. Accordingly, it is necessary to maintain the light polarizing state of the external light 109 before and after the reflection and the diffusion within the backlight 129. Therefore, in this embodiment, the light polarizing maintaining scattering layer 125 and the light polarizing maintaining scattering reflection plate 127 are used. When a sufficient scattering state is obtained by the first and second light polarizing maintaining scattering layers, the light polarizing maintaining scattering reflection plate 127 may be also set as a mirror face.

Light is also scattered and reflected by arranging the light polarizing maintaining scattering layer 125 and the light polarizing maintaining scattering reflection plate 127 to reduce the problem of a double image caused by parallax, etc.

The problem of the double image, etc. will be explained first.

In a conventional reflection type liquid crystal display in which a liquid crystal cell having light polarizing plates on both faces is provided and a reflection plate is also arranged outside the liquid crystal cell, a white image (light image) is formed on a surface of the reflection plate, and a black image (dark image) is formed in the position of a first light polarizing plate 120 disposed onto an observer's side thereof. Accordingly, when these images are observed in a slanting direction shifted from a substrate normal line of the liquid crystal display, a display image is seen in which the positions of the white and black images are shifted (are floated upward). Accordingly, a problem exists in that a double image caused by parallax is seen.

Further, in a case in which the external light 109 reaches the observer by passing through different pixels when the external light 109 is incident on the liquid crystal display and after the external light 109 becomes reflected light 110, the brightness levels and luminance levels of the pixels at the incident and reflection times are averaged and recognized by the observer. Accordingly, when the white and black images are adjacent to each other, a pixel to be originally seen as white looks slightly dark, etc. Therefore, a frizzy appearance of the display image is recognized, and a deterioration in image quality is caused. This problem becomes even more serious in a liquid crystal display using a color filter. Namely, when the external light and the reflected light pass through color filters of different colors, the color filters absorb the different colored lights in nature. Accordingly, the light can be hardly transmitted, and the brightness of the display image is greatly reduced together with the fuzzy appearance of the display image.

These problems become notable as the thickness of the glass substrate constituting the liquid crystal cell is increased, and the distance between the display element and the reflection plate is increased. Therefore, a deterioration in image quality is caused. Accordingly, it is necessary to reduce the thickness of the glass substrate and the distance between the display element and the reflection plate so as to prevent this deterioration in image quality.

With this in mind, the invention provides a structure in which the light emitting means is arranged in front of the reflection plate. Accordingly, the problem of increasing the distance between the position (reflecting position of the external light) where the white image is formed and the position (the position of the light polarizing plate) where the black image is formed remains. However, this problem is solved in accordance with the invention by arranging the light polarizing maintaining type scattering layer 125 between the liquid crystal cell 132 and the light guide body 126 to make the image forming positions of the white and black images approach each other. In this embodiment 1, no color filter is arranged. Accordingly, the problem of light interruption due to the color filter is naturally solved, and the problems of the so-called double image and the fuzzy appearance of the image are also solved so that the deterioration in image quality is prevented. These operational effects will be explained next.

First, the external light 109 is transmitted through the first light polarizing plate 120 of the liquid crystal cell 132, the liquid crystal layer 122 and the second light polarizing plate 124. After light and dark image information is obtained, the external light 109 is transmitted through the light polarizing maintaining scattering layer 125, and is reflected on the light polarizing maintaining scattering reflection plate 127. The external light 109 is again transmitted through the light polarizing maintaining scattering layer 125 so that the external light 109 is scattered plural times. This light again has an approximately uniform intensity distribution. This uniform light is first transmitted through the liquid crystal cell 132, and an observer recognizes this light as an image. In this case, the black image is formed in the first light polarizing plate 120, and the white image is formed between the liquid crystal cell 132 and the light guide body 126, i.e., at a position of the light polarizing maintaining scattering layer 125. As a result, the distance between the white and black images can be shortened. Thus, the problems of double image due to parallax and the fuzzy image due to the averaging of brightness can be solved, and a display element of high image quality can be obtained. The light polarizing maintaining scattering reflection plate 127 operating as a reflecting means need not necessarily have a scattering means to obtain the above effects of making the image forming distances approach each other. However, it is more desirable that the reflecting means also has a scattering means in consideration of a viewpoint in which a uniform property of emitted light of the backlight at the light emitting display time is obtained.

The problems of the double image due to parallax, the fuzzy image, the light interruption due to the color filter, etc. can be solved for the first time by using the construction provided in the embodiment 1 according to the above description, while the light efficiency is increased. Accordingly, it is possible to obtain a display element in which both the colored light emitting display and the reflection display with high image quality can be performed by one display element. Power consumption also can be reduced by only the driving circuit section 105. Therefore, when it is sufficient to obtain effects of only the driving circuit 105, for example, it is also possible to use a reflection type display element of a front light type as the display element 101 in addition to the display element 101 of the invention. In the present system, negativity and positivity of the image are not inverted at the color light emitting display time and the reflection display time. Therefore, the contrast ratio is not easily reduced even when the external light is superposed on light from the white LED 128 as a light source at the field sequential color display time. Image display easily visualized (having high tolerance) can be performed at any time under various environments of different brightness levels.

As mentioned above, if the driving circuit section 105 and the display element 101 of this embodiment are used, it is possible to realize a bright display unit in which the power consumption is low and the contrast is high in each of the light emitting display and the reflection display.

(Embodiment 2)

An embodiment 2 of the display unit according to the invention will be explained with reference to FIG. 10.

The display unit of this embodiment is constructed such that the field sequential color display also can be performed at the reflection display time. This display unit is characterized in that a second liquid crystal cell 133 is newly arranged on the liquid crystal cell 132 of the display unit in the embodiment 1. In this embodiment, various voltages are superposed and applied to this second liquid crystal cell 133 and the birefringence of this liquid crystal cell is changed so that the transmission spectrum is arbitrarily adjusted and is utilized as a switchable color filter. In another example of the switchable color filter, a tunable filter of COLORLINK Corporation, etc. is also preferable.

Figure 10:
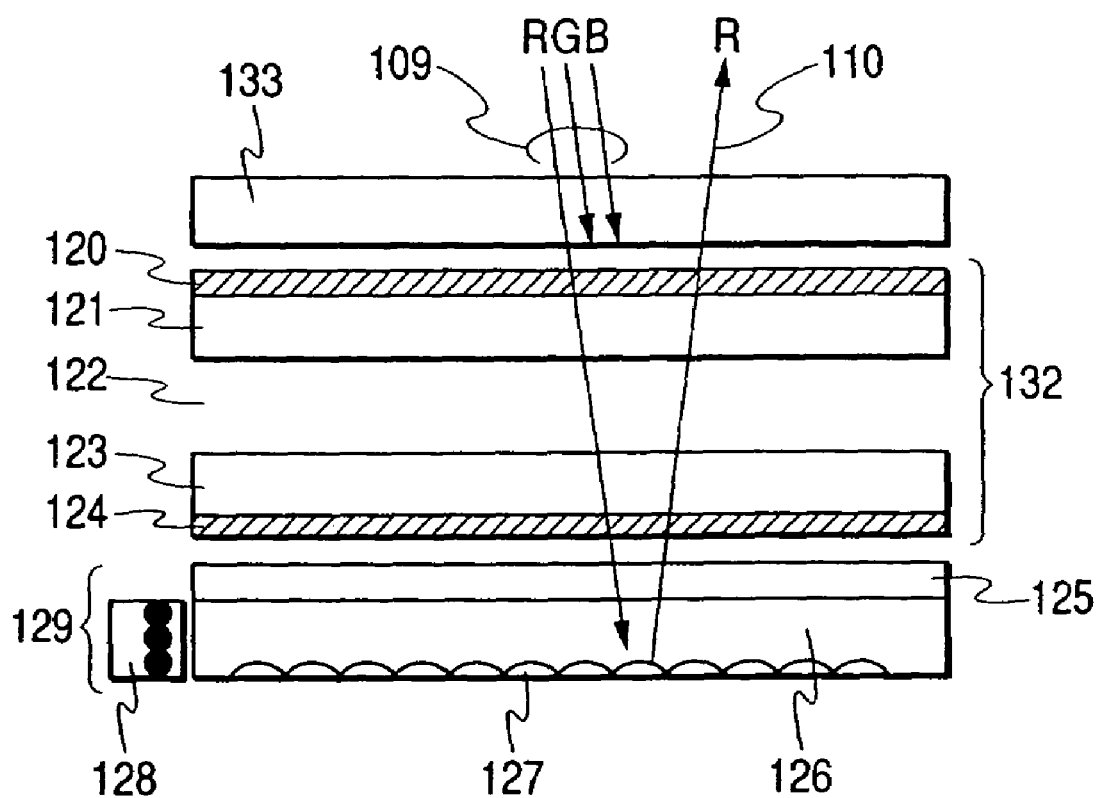
FIG. 10 is a cross-sectional view of a display unit in an embodiment 2 of the invention.

FIG. 10 shows a state in which the second liquid crystal cell 133 functions as a red (R) color filter at the reflection display time. In this embodiment, the voltage applied to the liquid crystal cell is changed by synchronizing these filter colors sequentially changed and the field sequential image display. The color display corresponding to each subframe is sequentially performed so that an image is displayed in color.

The light amount is reduced by this construction since the color filter is used. However, since this construction is combined with the display unit in the embodiment 1, it is possible to obtain a display in which the above effects are obtained, i.e., the double image caused by parallax and the fuzzy image due to averaging of luminance are eliminated. Since the entire face has a single color, there is no case in which the colors of transmitting filters of the incident light and the reflected light are different from each other. Therefore, the above problem of light interruption of the color filter caused by parallax is not caused. Accordingly, it is possible to sufficiently perform bright color image display with high image quality in comparison with the display unit using the normal color filter.

It is considered as one of the optimum utilization modes of the display unit having the above effects that the above reflection type field sequential color display is performed at the reflection display time, and the bright field sequential color light emitting display described in the embodiment 1 is performed without using the switchable filter at the color light emitting display time. In this case, it is desirable to arrange a filter switching circuit section for switching between use and non-use of the switchable color filter in the driving switching circuit section 106 in accordance with necessity. Concretely, there is a method in which an organic LED selection switch (light source selection switch) and a liquid crystal selection switch for selecting the second liquid crystal cell 133 are independently arranged, and the color light emitting display and the reflection display are switched in accordance with the necessity of a user or device control software. The color filter can be also unused and the above reflection black-and-white mode can be also used at the reflection time in accordance with necessity of the user, etc.

It is possible to realize a bright image display with reduced power consumption by using the above construction at each of the color light emitting display time and the reflection display time.

(Embodiment 3)

Figure 11A:
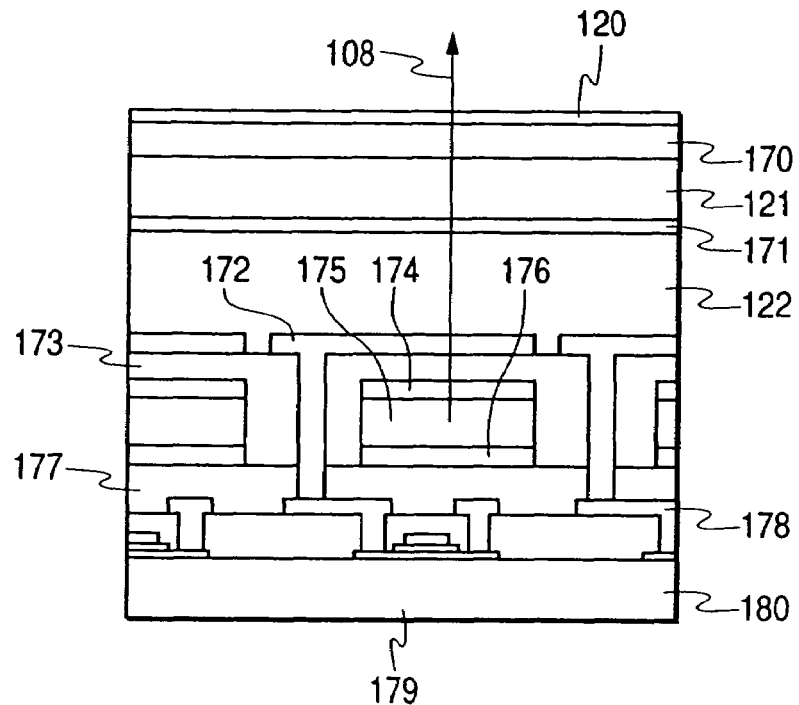
FIGS. 11(a) and 11(b) are cross-sectional views of a display unit in an embodiment 3 of the invention.

An embodiment 3 of the display unit in the invention will be explained with reference to FIGS. 11(a) and 11(b), which are cross-sectional views of a display element of the embodiment 3. FIG. 11(a) shows the case of a color light emitting display mode, and FIG. 11B shows the case of a reflection display mode.

Figure 11B:
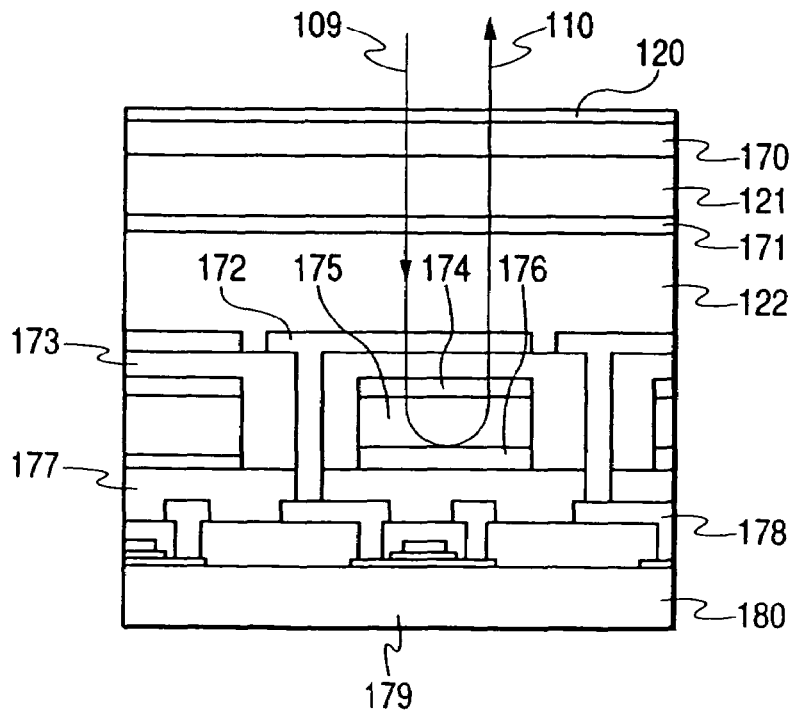

In the embodiment 3, the display unit in each of FIGS. 11(a) and 11(b) is constructed by including a light polarizing plate 120, a phase plate 170, a glass substrate 121 having a transparent electrode 171, a liquid crystal layer 122, a liquid crystal pixel electrode 172, an organic LED anode electrode 174, an organic LED layer 175, an organic LED cathode electrode 176, a transistor 179, a wiring layer 178 for making electric connection between transistors 179, between the transistor 179 and the liquid crystal pixel electrode 172, and between an another (non-illustrated) transistor and the organic LED cathode electrode 176, etc., insulating layers 173, 177 arranged between wires, an active matrix substrate 180 in which pixels constructed by the transistor 179, etc. are formed in a matrix shape, etc.

The transparent electrode 171, the liquid crystal pixel electrode 172 and the organic LED anode electrode 174 are formed by indium tin oxide (ITO). The liquid crystal layer 121 is a liquid crystal layer of twist nematic orientation. In the orientation of this liquid crystal layer, another mode also can be used if it is another liquid crystal display mode which can perform the reflection type display of a single light polarizing plate type. A polycarbonate film extended in a specific direction and having a birefringence property is used as the phase plate 170. A polyvinyl alcohol film, a polystyrene film, etc. are also suitable as another material of the polycarbonate film.

The relation of the display unit of the embodiment 3 shown in FIGS. 11(a) and 11(b) and the display unit shown in FIG. 1 will be explained here. The liquid crystal layer 122 corresponds to the light polarizing state modulating means 102, and the organic LED layer 175 corresponds to the colored light emitting means 103, and the organic LED cathode electrode 176 corresponds to the reflecting means 104.

Details of FIGS. 11(a) and 11(b) will be explained next.

FIG. 11(a) shows a case in which color light emitting display is performed in the display element. In the display element, the organic LED layer 175 is operated, and light 108 is emitted to the exterior of the display element. In the color display, the organic LED layer of one of the three primary colors RGB is formed in each subpixel, and the three subpixels of RGB are set as one pixel, and the luminance of each subpixel within each pixel is arbitrarily adjusted. In the embodiment 3, the reflection type display system of a single light polarizing type and a normally black mode for performing black display at a voltage non-application time are adopted. Accordingly, the phase plate 170 and the liquid crystal layer 122 can be entirely equivalently operated as a one-fourth wavelength plate at a lighting time of the organic LED 175. Namely, even when external light 109 is incident on the display element, a light polarizing state of the incident light is modulated by the phase difference plate 170 and the liquid crystal layer 122 and is absorbed by the light polarizing plate 140. Therefore, no reflected light is finally emitted to the exterior of the display element, and no external light is offset and superposed. Accordingly, it is possible to obtain an effect in which a deterioration in the contrast ratio of a colored light emitting image is prevented.

FIG. 11(b) shows the case of the reflection display mode, and shows a state in which the liquid crystal layer 121 is operated, and the external light 109 is modulated in intensity and is simultaneously reflected, and an image is displayed by the reflected light 110. In this case, the organic LED cathode electrode 176 functions as a reflection plate.

In a use in which it is sufficient if necessary and sufficient contrast is obtained, an effect of an increase in numerical aperture, i.e., luminance is obtained by omitting the black matrix. Further, in this case, it is unnecessary to align upper and lower substrates so that a panel is easily made and cost is reduced. On the other hand, in a use in which a deterioration in contrast is prevented, the black matrix can be naturally used. Further, the display unit can be usefully constructed such that the cell gap can be set with high accuracy, and it is unnecessary to align the substrates with each other by using a spacer for controlling the thickness between the substrates as a column structure.

The display unit of the embodiment 3 respectively performs display by a luminance adjustment of the organic LED at the color light emitting display time, and a luminance adjustment of the liquid crystal at the reflection display time. Accordingly, power consumption can be reduced, and a bright image display can be realized. Further, a reflection electrode layer of the organic LED layer also can be used as a reflection plate in the liquid crystal display element by arranging the organic LED layer and the liquid crystal layer on the same substrate. Further, since a necessary element is formed between a pair of substrates, there is an advantage in that the display element can be entirely reduced in thickness. Furthermore, since the position at which a black image (dark image) is formed and the position at which a white image (light image) is formed can be set to approach each other, there are also advantages in that the above problems of the double image caused by parallax and the fuzzy image due to averaging of luminance can be removed. Further, since no color filter is used, no problem of light interruption of the color filter caused by parallax is caused.

In a concrete example of switching of the display method, it is considered that an organic LED selection switch and a liquid crystal selection switch are independently arranged, and the color light emitting display and the reflection display are switched in accordance with the necessity of a user, etc. This construction will be explained next.

Figure 12:
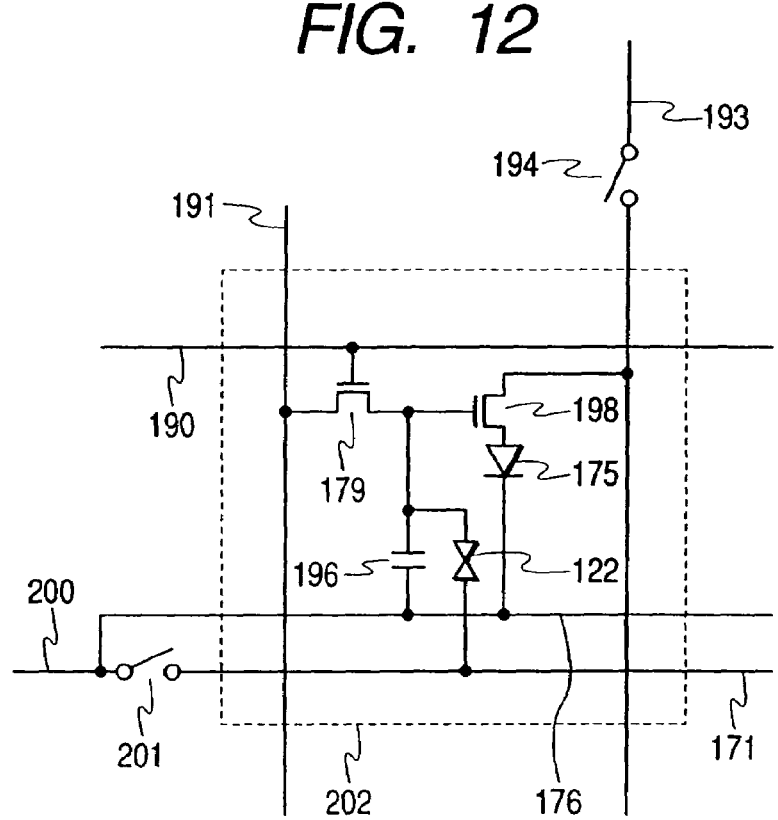
FIG. 12 is a schematic circuit diagram of the construction of a pixel circuit of the display unit in FIG. 11.

FIG. 12 is a view showing an equivalent circuit of a pixel in the display element of the embodiment 3. An area surrounded by a broken line shows one subpixel 202, and the actual display section is constructed such that a plurality of subpixels 202 are arranged longitudinally and transversally by a predetermined desirable number to form a matrix arrangement.

Each pixel includes at least a first transistor 179, a holding capacitor 196, a liquid crystal layer 122, an organic LED layer 175 and a second transistor 198. An organic LED selection switch 194 and a liquid crystal selection switch 201 are arranged outside the pixel.

The organic LED selection switch 194 is connected to an unillustrated electric current supply source, and the liquid crystal selection switch 201 is connected to a portion having a common electric potential. A drain and a gate of the first transistor 179 are respectively connected to a data line 191 and a scanning line 190. This transistor 179 sample-holds a signal Vd of the data line 191 by the timing of a selection pulse inputted from the scanning line 190 to the gate. Namely, this electric potential is written to the holding capacitor 196 arranged between the transistor 179 and common wiring 200.

When the organic LED selection switch 194 is turned on and the liquid crystal selection switch 201 is turned off, an operation of the second transistor 198 is controlled by the signal Vd, and an electric current is supplied to the organic LED layer 175 by the electric current supply line 193, and the organic LED layer 175 emits light at a specific intensity in accordance with an electric current value. The electric current value may be constantly set, and light emitting luminance may be also adjusted by time width.

In this state, no voltage is applied to the liquid crystal layer 122 so that no liquid crystal layer 122 is operated. Namely, this state shows that the color light emitting display is performed by only the light emitting luminance of the organic LED layer. As mentioned above, since the liquid crystal layer 122 in this state functions as a one-fourth wavelength plate, the display unit can perform high image quality display of high contrast.

In contrast to this, when the organic LED selection switch 194 is turned off and the liquid crystal selection switch 201 is turned on, the liquid crystal layer 122 is operated by the signal Vd, and no organic LED layer 175 emits light, since the second transistor 198 is turned off. Namely, the reflection display is performed by reflection of the external light and the effect of luminance modulation of this external light using the liquid crystal layer.

Operations of the organic LED layer 175 and the liquid crystal layer 122 can be arbitrarily switched by using such a construction in accordance with necessity. Further, the color light emitting display and the reflection display using the operation of the liquid crystal layer can be easily switched by arranging the respective subpixels 202 of the three primary colors RGB in parallel with each other and independently operating the subpixels 202. When the reflection display is to be set to the black-and-white display, it is sufficient to arrange only one liquid crystal pixel electrode 172 for operating the liquid crystal layer 122 in three subpixels, and it is also sufficient to arrange only one first transistor 179 connected to this liquid crystal pixel electrode 172 in three subpixels. In this case, the number of pixels operated at the black-and-white reflection display time can be set to one-third in comparison with the color light emitting display so that power consumption can be greatly reduced.

(Embodiment 4)

Figure 13:
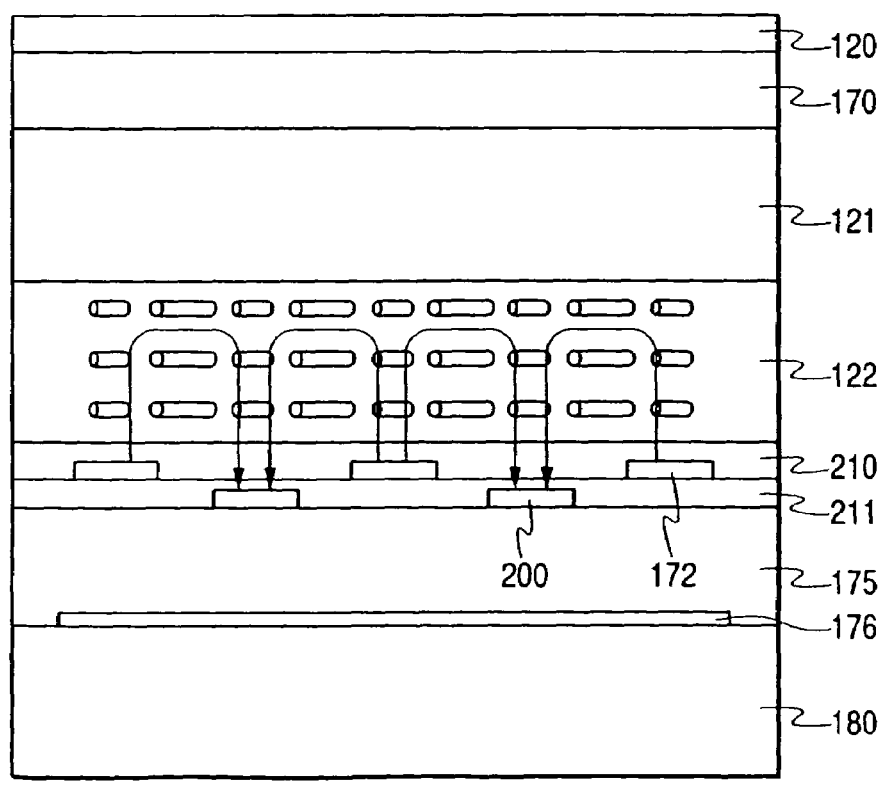
FIG. 13 is a cross-sectional diagram of a display element in an embodiment 4 of the invention.

A display element in an embodiment 4 will be explained with reference to FIG. 13.

The display element of the embodiment 4 is constructed by including a first light polarizing plate 120, a phase plate 170, a glass substrate 121, a liquid crystal layer 122, a liquid crystal pixel electrode 172, insulating layers 210, 211, an organic LED layer 175, an organic LED cathode electrode 176, common wiring 200 common to both the liquid crystal layer 122 and the organic LED layer 175, an active matrix substrate 180 in which pixels constructed by a transistor, a wiring layer, etc. are formed in a matrix shape, although this shape is not illustrated, etc. A wiring layer and a transistor under the organic LED cathode electrode 176 are omitted for brevity in FIG. 12.

The liquid crystal pixel electrode 172 and the common wiring 200 are formed by ITO. The liquid crystal layer 122 has an orientation film and is a liquid crystal layer of homogeneous orientation, although this construction is not illustrated. An organic LED layer for emitting any one of the three primary colors RGB is formed in each of the subpixels arranged in parallel with each other. At the light emitting display time, the color display can be performed by arbitrarily modulating luminance levels of the three subpixels of RGB.

The embodiment 4 is characterized in that the common wiring 200 is arranged between the organic LED layer and the liquid crystal layer 122. The common wiring required in each of the organic LED layer 175 and the liquid crystal layer 122 can be combined by this construction. Further, an in-plane switching system for operating the liquid crystal by an electric field component parallel to the substrate can be adopted as the liquid crystal display system. In this case, it is necessary to adjust a liquid crystal material and the thickness of the liquid crystal layer so as to obtain a preferable contrast ratio in a display of the reflection type. Further, it is also necessary to arrange the phase plate 170 in accordance with necessity. In the embodiment 4, the phase plate 170 is a one-fourth wavelength plate, and the reflection display having preferable characteristics in angle of visual field can be obtained by adopting the in-plane switching system.

Figure 14:
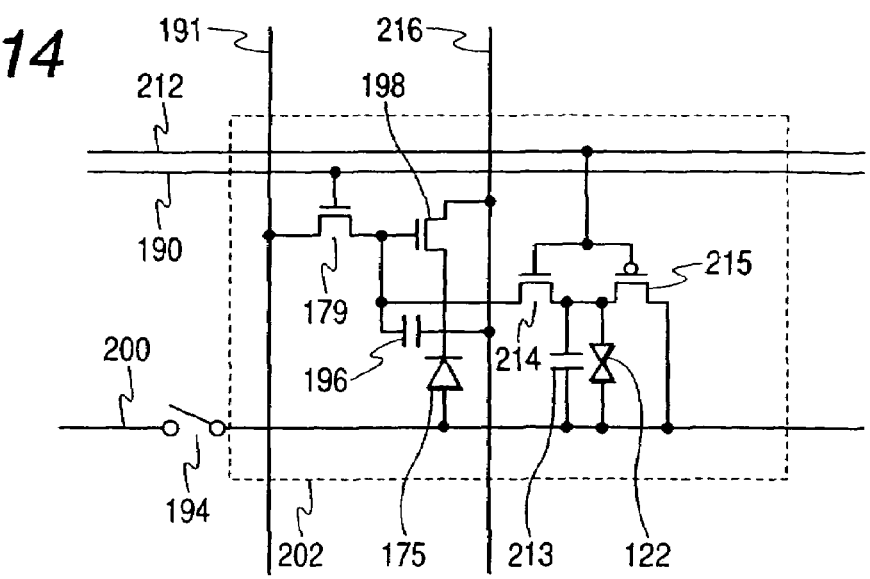
FIG. 14 is a schematic circuit diagram of the construction of a pixel circuit of the display element in FIG. 13.

The circuit construction of a pixel section of the display element in the embodiment 4 will be explained with reference to FIG. 14.

An area surrounded by a broken line shows one subpixel 202. Each subpixel is constructed by including at least a first transistor 179, a second transistor 198, a third transistor 214, a fourth transistor 215, a holding capacitor 196, an organic LED layer 175 and a liquid crystal layer 122. An organic LED selection switch 194 and a liquid crystal selection line 212 are arranged outside the subpixel.

The organic LED selection switch 194 is connected to an electric current supply source. Each of the first, second and third transistors is an NMOS (n-channel Metal Oxide Semiconductor), and the fourth transistor is a PMOS (p-channel MOS). A drain and a gate of the first transistor 179 are respectively connected to a data line 191 and a scanning line 190. Gates of the third and fourth transistors are respectively connected to the liquid crystal selection line 212.

A case in which the organic LED selection switch 194 is turned on and the liquid crystal selection line 212 is set to be low in voltage, will be explained. First, a signal Vd of the data line 191 is sample-held by the timing of a selection pulse inputted to the gate of the first transistor 179 through the scanning line 190. Concretely, the signal Vd is written to the holding capacitor 196 arranged between the data line 191 and organic LED common wiring 216. An electric current supplied from common wiring 200 is applied to the organic LED layer 175 by controlling an operation of the second transistor 198 by a voltage of the signal Vd written to the gate holding capacitor 196. Thus, the organic LED layer 175 emits light at specific intensity in accordance with this electric current value. The electric current value can be constantly set, and the light emitting luminance also can be adjusted by time width.

At this time, the third transistor is turned off, and no voltage Vd of the holding capacitor 196 is applied to the liquid crystal layer 122. However, since the fourth transistor 215 is turned on, both ends of the liquid crystal layer 122 are connected to the common wiring 200. Accordingly, the voltage applied to the liquid crystal layer 122 becomes 0 Vrms so that the liquid crystal layer 122 is not operated, and contributes to an improvement of contrast ratio as a one-fourth wavelength plate.

When the organic LED selection switch 194 is turned off and the liquid crystal selection line 213 is set to be high in voltage, the fourth transistor 215 is turned off and the third transistor 214 is turned on. Therefore, the liquid crystal layer 122 is operated by the signal voltage Vd written to the holding capacitor 213. At this time, since the second transistor 198 is turned off, no organic LED layer 175 emits light. Accordingly, reflection display using the liquid crystal layer can be performed.

The display element using in-plane switching can be provided by the above construction, and operations of the organic LED layer 175 and the liquid crystal layer 122 can be arbitrarily switched in accordance with necessity. Further, the color light emitting display and the reflection display of the liquid crystal operation can be easily switched by independently adjusting the light emitting luminance levels of the respective subpixels of the three primary colors RGB arranged in parallel with each other.

Figure 15:
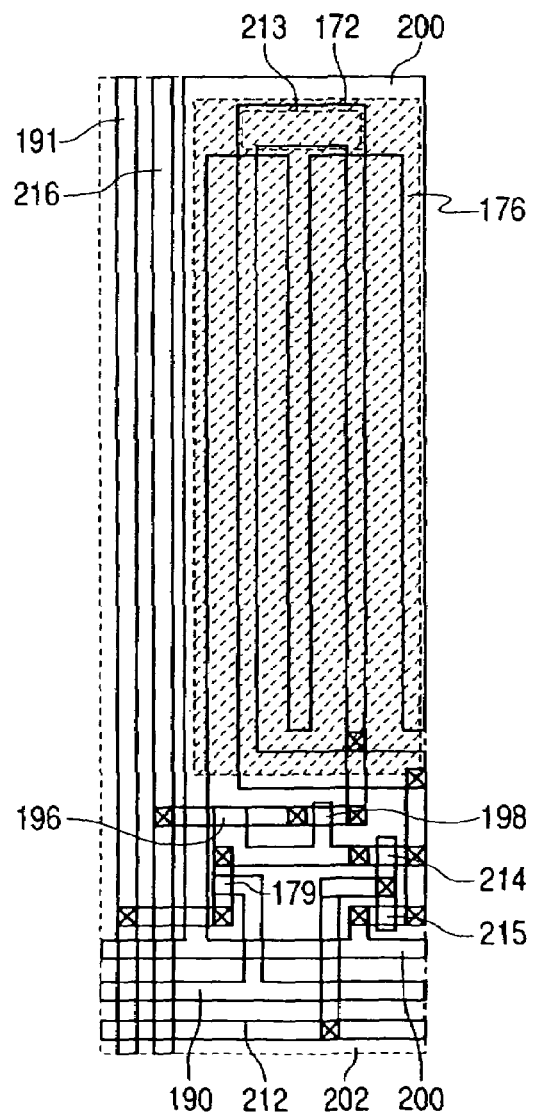
FIG. 15 is a layout plan view of the pixel circuit of the display element in the invention.

FIG. 15 is a view showing one subpixel 202 in one example of the layout of a pixel structure in the embodiment 4.

A display section is constructed by longitudinally and transversally arranging subpixels 202 by a required number in parallel with each other. The construction of each subpixel is similar to that in FIG. 14.

The holding capacitor 196 is formed by crossing a source electrode of the first transistor and the organic LED common wiring 216. The holding capacitor 213 is formed by crossing the liquid crystal pixel electrode 172 and the common wiring 200. In FIG. 15, the organic LED anode electrode 176 and each of the first to fourth transistors 179, 198, 214, 215 are not overlapped. However, the numerical aperture can be increased by overlapping the organic LED anode electrode 176 on the above transistors. The liquid crystal pixel electrode 172 can be also overlapped on the above transistors.

(Embodiment 5)

Figure 16:
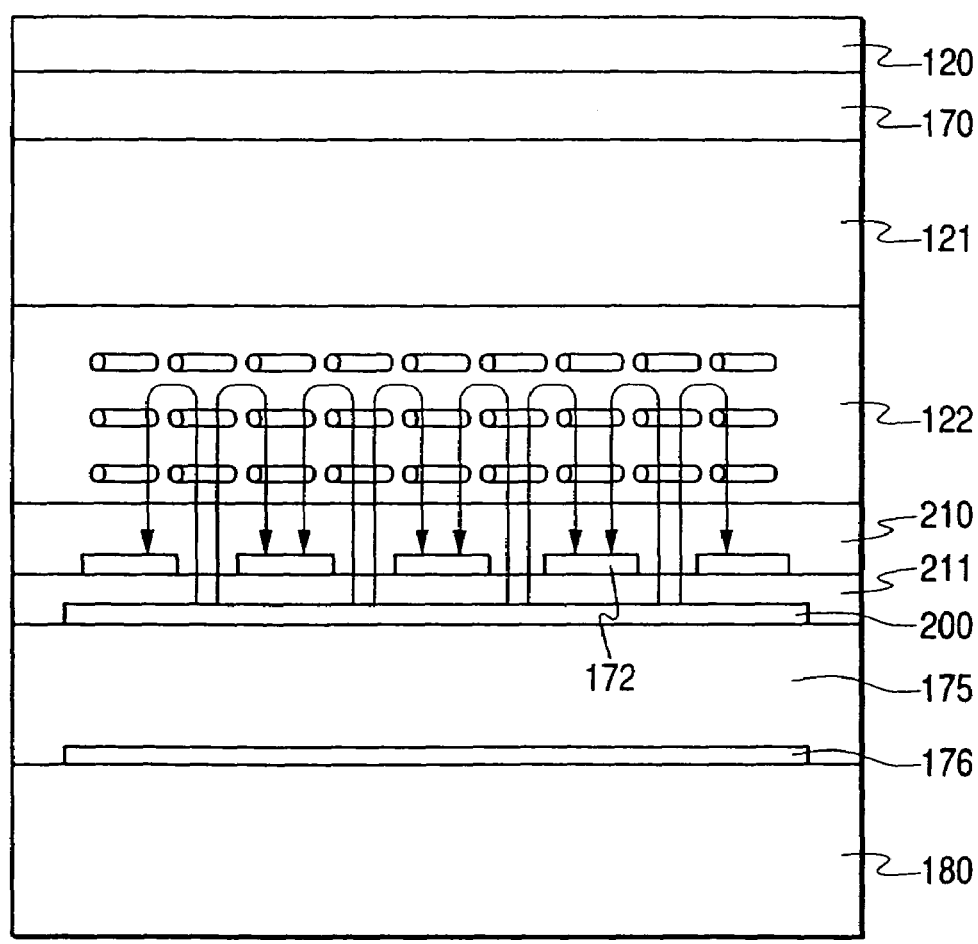
FIG. 16 is a cross-sectional diagram of a display unit in an embodiment 5 of the invention.

FIG. 16 shows a cross-sectional view of a display element of an embodiment 5. The embodiment 5 is characterized in that common wiring 200 is arranged approximately on the entire face of a lower portion of the liquid crystal pixel electrode 172. A light emitting area of the organic LED layer 175 is formed approximately in an entire area of pixels by this construction so that a high numerical aperture can be realized, and the luminance can be increased.

(Embodiment 6)

FIGS. 17(a) and 17(b) are typical views of the external appearance of a portable phone having the display unit according to an embodiment 7 of the invention.

FIG. 17(a) shows a state in which information is monochromatically displayed in the display element 101 at a so-called "standby time" such as a time at which the portable phone 200 waits for an operation, etc.

FIG. 17(b) shows a state displaying information in color in the display element 101 at a so-called "using time" such as a signal reaching time, etc. In this concrete example, a talking partner is displayed.

The portable phone 220 of the embodiment 6 is constructed by including an antenna 221, a speaker 222, a display element 101, a key 223 such as a ten-key pad, etc., a microphone 224 and a camera 227 in each of FIGS. 17(a) and 17(b).

In a mode of use of the portable phone, it is general to display the remaining amount of life of the storage battery by an icon 225 even at the standby time, and display time at any time. In the future, a function of the portable phone as a portable information terminal will be provided and, for example, a using form of use for displaying a schedule at any time can be also sufficiently considered.

However, in the display method at the so-called standby time, it is sufficient to perform character display and icon display to a necessary minimum limit. Therefore, it is sufficient to perform black-and-white display or monochromatic display, and the time ratio at the standby time is generally larger than that at the using time. In consideration of such situations, a most important performance required at the standby time is to reduce power consumption. Accordingly, the display system at the standby time is suitably a reflection type display system.

Figure 18:
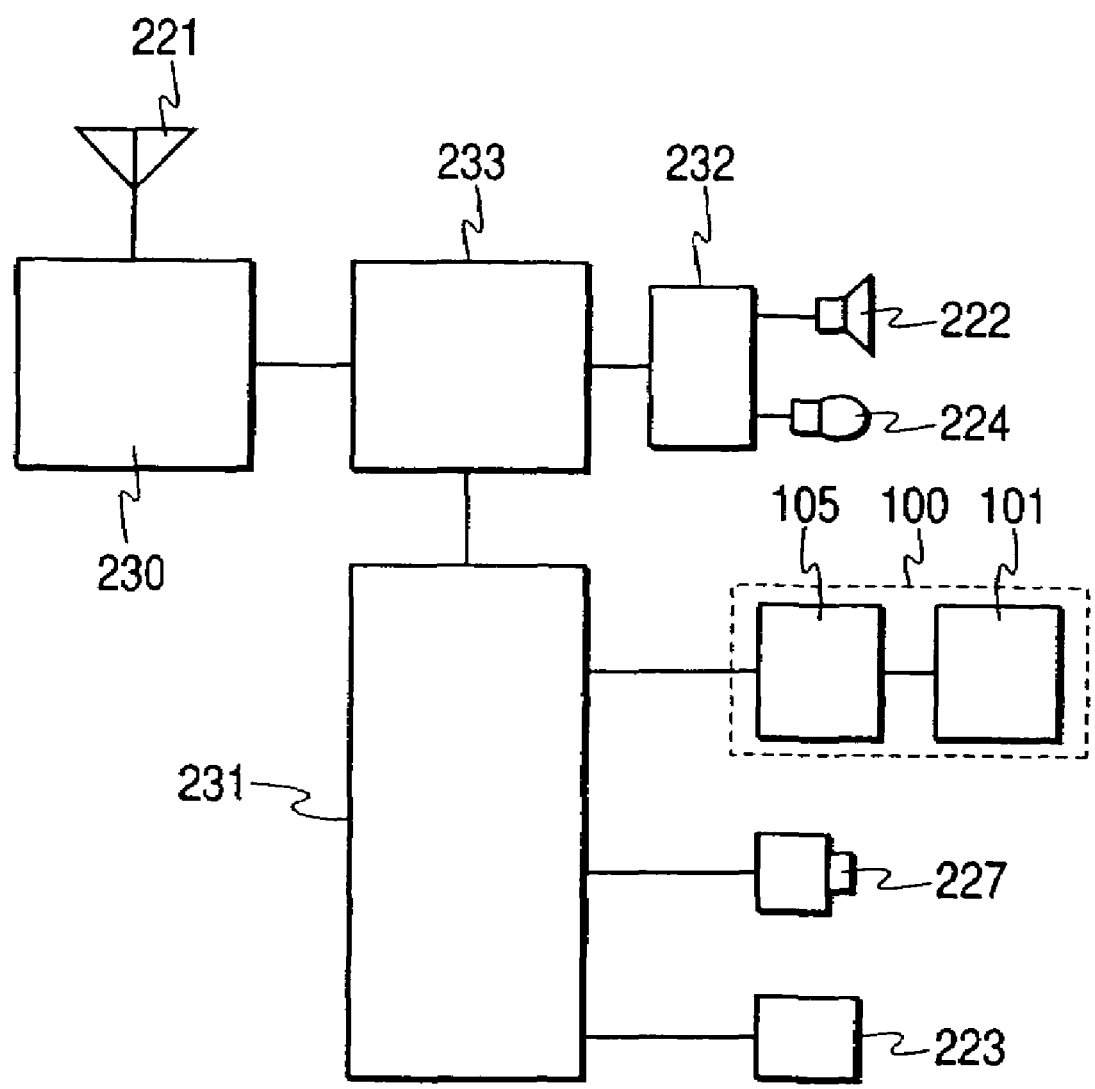
FIG. 18 is a block diagram showing a main construction of the portable phone.

FIG. 18 is a block diagram of a main construction of the portable phone 220 of the embodiment 6.

The portable phone 220 of the embodiment 6 has an antenna 221, a wireless section 230, a talking processing section 233, a voice processing section 232, a control section 231 of the entire device, a camera 227, a speaker 222, a microphone 224, a key 223 such as a ten-key pad, etc., a display unit 100 using the invention, an unillustrated storage battery, etc. The control section 231 of the entire device judges the display state of an image (e.g., color display, monochromatic display) and generates an image signal or a control signal according to each display state, and it transmits this generated signal to a driving circuit section. In this specification, the judgment of the display state also includes an operation switched by timing.

As already described, the display unit 100 of the invention is constructed by including the driving circuit section 105 and the display element 101. The control section 231 of the entire device and the driving circuit section 105 can be partially or entirely overlapped with each other in a certain case in generation, conversion, transmission and reception of the image signal, control of the clock frequency, etc. For example, there is also a case in which the driving section 105 is included within the control section of the entire device.

The driving circuit section 105 in the display unit 100 of the embodiment 6 has a driving method switching circuit section for switching the color light emitting display and the reflection display. In a switching condition of the display state, there are at least two cases including a case of switching from the color light emitting display to the reflection display, and a case of switching from the reflection display to the color light emitting display.

For example, there are the following timings in the switching timing from the reflection display or the black-and-white reflection display to the color light emitting display. In a main timing, there is a specific operation of a user such as the following (1a) to (1g), and timing such as (1h) to (1k) can be also set to a switching timing. A judgment about the switching timing of the color light emitting display and the reflection display is made by one of the control section 231 and the display unit 100, or both the control section 231 and the display unit 100 in cooperation with each other.

(1a) When a specific key is pushed down.
(1b) When a folding state is switched to an open state.
(1c) When a slide type cover and a strap cover are set to an open state.
(1d) When a display section is exposed (a terminal having a structure in which the display section is closed at an unusing time).
(1e) When a specific voice is sensed (a terminal having a voice recognizing function).
(1f) When a specific area of a touch panel is pushed down (a terminal having the touch panel).
(1g) When a dial is operated (a terminal having rotation, pushing-down and the dial).
(1h) When a signal arrives.
(1i) When an infrared signal is received (a terminal having an infrared interface such as IrDA, etc.).
(1j) When a color image is received at a data communication time.
(1k) When a time preset by a user and application has passed.
(1l) When talking is terminated.

Conversely, for example, there are the following timings in the switching timing from the color light emitting display to the reflection display or the black-and-white reflection display.

(2a) When a specific key is pushed down.
(2b) When an open state is switched to a folding state.
(2c) When a slide type cover and a strap cover is closed.
(2d) When the remaining amount of a storage battery is equal to or smaller than a constant value.
(2e) When a specific voice is sensed (a terminal having a voice recognizing function).
(2f) When a specific area of a touch panel is pushed down (a terminal having the touch panel).
(2g) When a dial is operated (a terminal having rotation, pushing-down and the dial).
(2h) When talking is terminated.
(2i) When an infrared signal is received (a terminal having an infrared interface such as IrDA, etc.).
(2j) When image data is constructed by only a character) such as a text and an icon, etc.).
(2k) When a time preset by a user and application has passed.
(2l) When talking is started.

The switching timing is not limited to only the timings described in the embodiment 6.

In another example of the above switching timing, control of the portable phone utilizing a connection service to the Internet such as the World Wide Web (hereinafter called WWW) is also considered. This construction will be explained next.

A WWW site is normally described by HTML (Hyper Text Markup Language) as one kind of a markup language in which tag information describing the attribute of a text and an image in a sentence is buried into the sentence. Software normally called a browser is used to display this WWW site in the display unit of a terminal of a person getting access to the WWW site. This browser has a function for referring to the tag information buried into the HTML, and displaying the text and the image in the sentence, etc. by a shaping arrangement. Processing of the HTML represents a large burden to an arithmetic unit of a device in which low power consumption of the portable information terminal, etc. is important. Therefore, a new markup language considering a reduction in burden, such as a Compact HTML released by W3 Consortium, an MML (Mobile Markup Language) released by SFC research consortium MOBIDY project of keio-Gijyuku University, etc. has been developed. Practical use of these languages in the portable information terminal is expected.

In any markup language, color information can be designated as the attribute of the text, the image, etc. Concretely, color at the display time can be designated to the browser by describing a color attribute in the tag information. The browser can refer to the color attribute in the tag information in the sentence described by the markup language, and can suitably display a color of the text, the color of a background image, etc. Namely, the tag information originally describing the attribute of the text and the image, etc. in the sentence can be utilized as an element capable of judging efficient control of consumed power.

A concrete processing flow will be explained by using FIG. 19. The operation of an information device such as a portable information terminal, a portable phone, etc. is controlled by basic software normally called an OS (operating system). It is necessary that commands are given to the OS through an API (Application Programming Interface) and the OS gives commands of mode switching to hardware so as to switch the color light emitting display mode and the reflection display mode, the black-and-white reflection display mode or the black-and-white display mode by the browser.

In a concrete example, several cases are considered as in the following cases (a) to (c).

Figure 19:
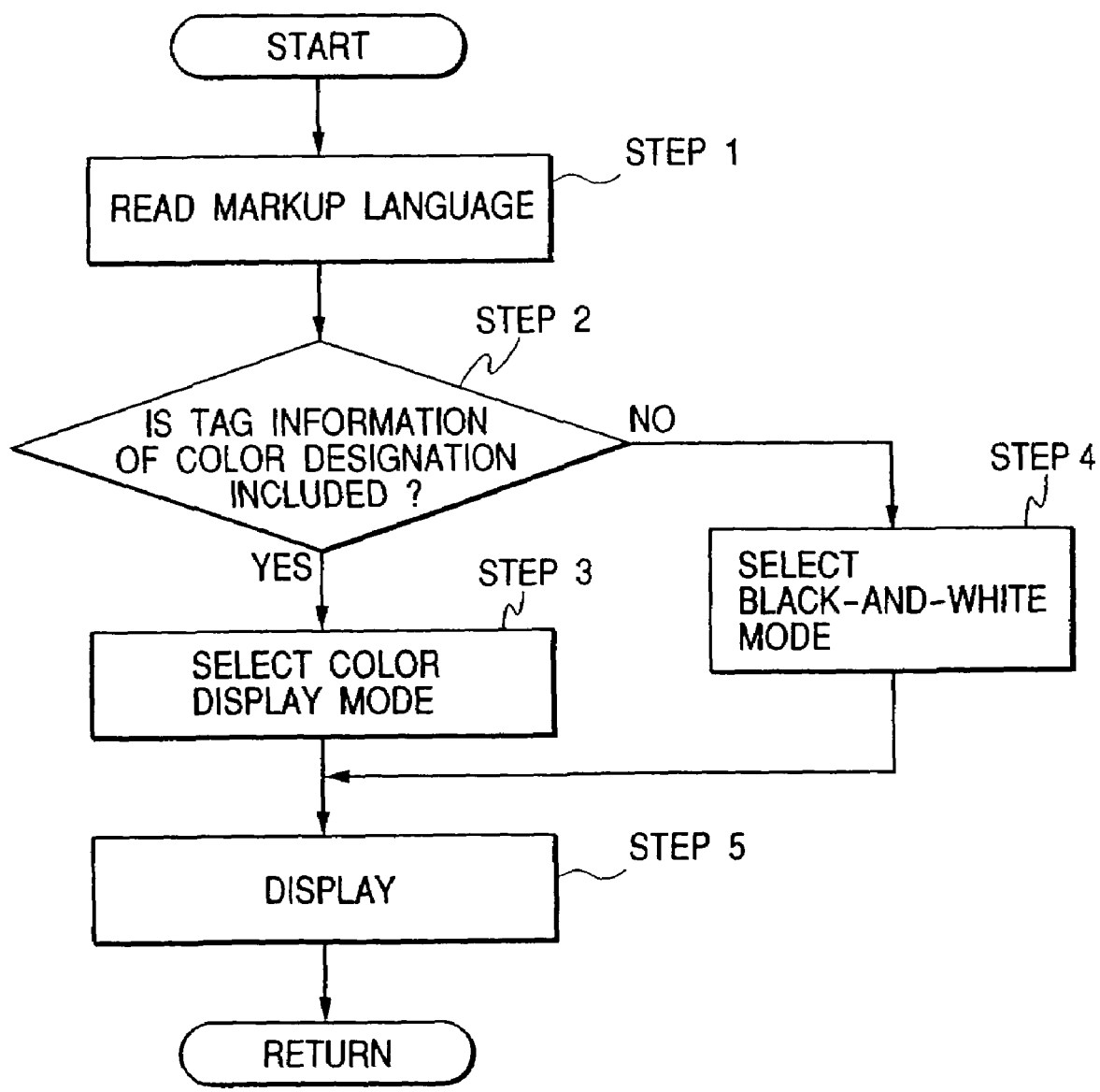
FIG. 19 is a diagram showing a processing flow of a markup language.

(3a) When steps 1 to 5 in FIG. 19 are performed by the browser.

(3b) When steps 1 to 5 in FIG. 19 are performed by the OS.

(3c) One portion of steps 1 to 5 in FIG. 19 is performed by the browser, and the other is partially performed by the OS.

Shield may be also formed such that only the OS can utilize the API for switching the color light emitting display mode and the reflection display mode, the black-and-white reflection display mode or the black-and-white display mode, and no user of the OS can use the API. Otherwise, it is also possible to use a construction in which the OS can manage hardware for switching the color display mode and the black-and-white display mode, but it is not necessary to prepare such hardware in the API. This construction corresponds to a case in which useless switching of hardware using software operated on the OS is prevented on an OS side. FIG. 20 illustrates an example of the markup language to be used.

FIG. 21 shows the display screen of a device having the display unit using the invention when this device has a function which is able to select several operating modes in accordance with the necessity of a user. For example, "1. clean" mode for performing the color light emitting display at any time at the time of use, "2. durable (indoor)" mode for performing black-and-white or monochromatic color display of low luminance at the time of use, and "3. durable (outdoor)" mode for allocating the reflection mode at any time even at the time of use can be set in the operating mode which can be selected by the user. The user selects one of modes 1 to 3 by a key operation. Consumed power of the device can be suitably managed by providing such a function in accordance with a request of the user. In other words, power consumption of an information device can be more effectively reduced and the information device can be easily used by controlling an operation of the display unit in accordance with the use of the information device.

A designer can arbitrarily allocate the above function to each operating mode in accordance with necessity. Further, operating mode is not limited to the embodiments in kind, number, name, etc.

A service to electronically order goods and settle accounts, etc. using an information device such as a portable phone, etc. is spread at present. FIG. 22 shows an embodiment relative to service utilizing a portable phone, etc. according to the invention. This service is formed from the relation between four persons established by a goods sales service provider, a connection service provider, a settlement provider and a user of the portable terminal 220 in this embodiment. Arrows between each of two persons among the four persons show service flows in information, goods, money, etc. as an example. For example, the goods sales service provider provides a service, such as sales of books, etc., provision of various kinds of information desired by the user, etc. One example of a providing means of the goods sales service is a goods sales service performed by a goods sales site opened on the Internet.

For example, the connection service provider is a portable phone company, which connects an information terminal of the portable phone possessed by the user, etc. to another information terminal, and provides a connection service to the Internet, etc. The settlement service provider receives a request from the goods sales service provider, and provides a service for proxy-executing settlement of the user.

For example, the settlement service provider may be a credit company, a bank, etc. The contract of a settlement proxy service is made in advance between the settlement service provider and the user. The settlement service provider can directly communicate details of the proxy-executed settlement to the user, or can communicate such information to the information terminal of the user through the connection service provider. Conversely, the user can connect the information terminal to the settlement service provider through the connection service provider, and can also confirm the settlement information.

A service form flow will next be explained. The user connects the information terminal of the portable phone, etc. to the goods sales service provider through the connection service provider, and orders predetermined desirable goods after the user selects the predetermined desirable goods, or inputs his or her name, etc. The goods sales service provider sends the goods to the user in accordance with the order from the user, and also asks the settlement service provider to pay for the goods. The settlement service provider proxy-executes the settlement of the user in accordance with the request from the goods sales service provider. The settlement service provider communicates details of the settlement to the user.

For example, in a process in which the user connects the information terminal to the goods sales service provider and orders goods and confirms the settlement, it is effective to prevent the generation of an error in the order caused by an error in operation of the user such that the scene of making a contract is emphasized by the color light emitting display so that the user will clearly recognize this scene.

In a concrete embodying method, there are several methods as in the following examples (a) to (d).

(a) The goods sales service provider buries commands or tag information for designating the color light emitting display into a code for performing specific screen display in advance, and transmits the commands or the tag information to the information terminal through the connection service provider. The information terminal performs the color light emitting display in accordance with the above received commands or tag information.

(b) The goods sales service provider buries commands or tag information for designating the color light emitting display into a code for performing specific screen display in advance. The connection service provider transmits second commands for designating the color light emitting display to the information terminal in accordance with the above commands or tag information. The information terminal performs the color light emitting display by receiving the above second commands received from the connection service provider.

(c) The goods sales service provider transmits a specific code, and the connection service provider receiving this code sets a response to specific commands or tag information included in this code in advance. If this response is designation of the color light emitting display, the connection service provider transmits second commands for designating the color light emitting display to the information terminal. The information terminal performs the color light emitting display by receiving the above second commands from the connection service provider.

(d) A response to specific commands or tag information included in a code transmitted from the goods sales service provider through the connection service provider is set in advance in the information terminal. If this response is the color light emitting display, the color light emitting display is performed.

Figure 23:
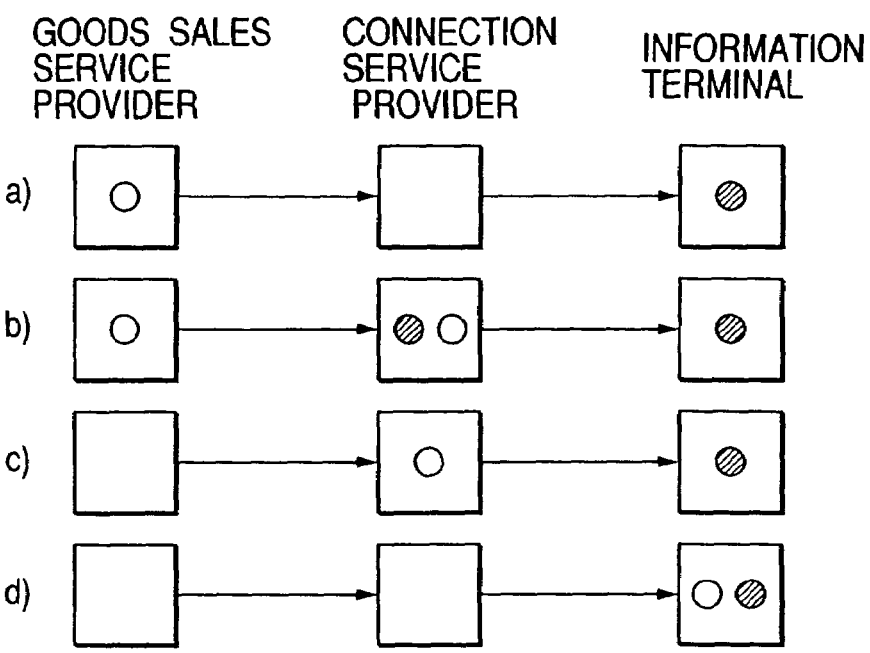
FIG. 23 is a block diagram of a processing operation of commands or tag information for commanding a color light emitting display.

FIG. 23 typically shows the relation of the above examples (a) to (d). A white circle (○) represents generation of commands or tag information instructing the color light emitting display, and a black circle (●) represents a processing operation corresponding to the commands or the tag information instructing this light emitting display. The processing operation represented by the black circle in the connection service provider corresponds to the generating ○ of commands or tag information newly instructing the color light emitting display. The processing operation represented by the black circle in the information terminal means that the color light emitting display is performed in accordance with the received commands or tag information instructing the light emitting display.

Another means for judging the contents of an image signal will be described with respect to timing for switching the color light emitting display and the reflection display. Here, a means for judging whether it is a color image or a black-and-white image will be explained. The following embodiments are considered as means for judging whether it is a color image or a black-and-white image.

(a) A comparing means for comparing whether each color image signal of RGB is the same or not is provided. If each color image signal of RGB is different, it is judged as a color image. In contrast to this, if each color image signal of RGB is the same, it is judged as a black-and-white image.

(b) A color/black-and-white control line is provided in addition to a transmission line of the image signal, and the color or black-and-white display is performed by referring to this control line on a display side.

(c) When the color image is transmitted, all transmission lines of each color image of RGB are used. In contrast to this, when the black-and-white image is transmitted, only a signal line of one color among the transmission lines of each color image signal of RGB is used, and a discriminating signal showing no superposition of the image signal is transmitted on signal lines of the other two colors, or these signal lines are set to be open. The color or black-and-white display is performed on the display side by referring to this transmission, etc.

When the image signal is a color image signal, the black-and-white display may be preferentially performed in consideration of low power consumption. In this case, it is necessary to convert the color image signal to a black-and-white image signal. The display unit of this embodiment and a device having this display unit have a means for converting the color image signal to the black-and-white image signal. The color light emitting display may be switched to the black-and-white reflection display by manual commands of a user, and may be also automatically switched when the battery charge level is equal to or smaller than a constant value, etc. The image signal of RGB is switched to the black-and-white image signal by synthesizing a luminance signal value of each color image of RGB with a weight of 299:578:114. There is no particular problem when an approximate value is used as the weight of RGB from the restrictions of a gradation bit number, a circuit scale, etc.

(Embodiment 7)

Figure 24:
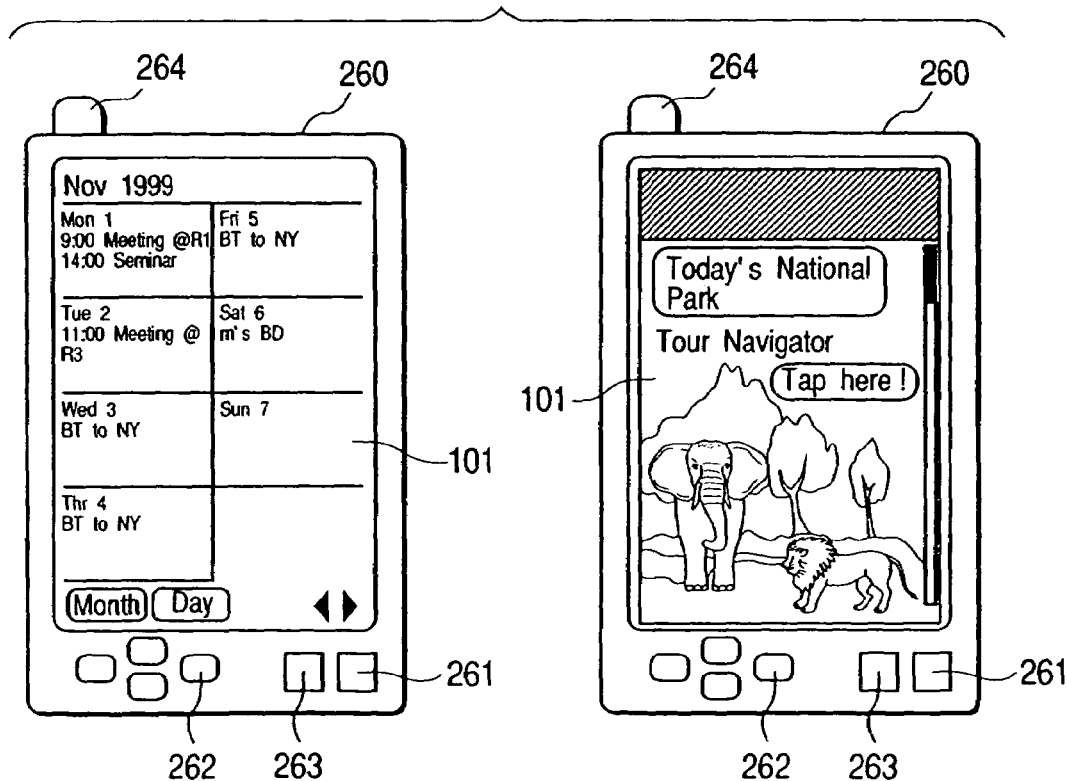
FIG. 24 is a diagram showing a typical view of an external appearance of the portable information terminal.

FIG. 24 shows a typical view of the external appearance of a portable information terminal unit having a display unit in an embodiment 7 of the invention.

The portable information terminal 260 of the embodiment 7 includes at least a display element 101, a main switch 261, a cursor key 262, a color light emitting/reflection display change-over switch 263, an antenna 264, etc.

FIG. 24 shows on the left a display element 101 in the portable information terminal 260 which performs the reflection display. Schedule management software is used as one example of a screen displayed by this display element 101. In contrast to this, FIG. 24 shows on the right a display element 101 in the portable information terminal 260 which performs the color light emitting display. The portable information terminal 260 is connected to the Internet through the antenna 264, and a state displaying information obtained from the World Wide Web site of a sightseeing spot is shown as one example of the screen displayed by the display element 101. The reflection display is preferably performed with respect to the confirmation of a schedule, etc., reference to only character information, and information often referred to so as to reduce power consumption as much as possible. In contrast to this, when the World Wide Web site including many color images is displayed, etc., it is possible to obtain a display characteristically rich in entertainment by performing color light emitting display. The portable information terminal 260 of this embodiment has a color light emitting/reflection display change-over switch 263, and is also constructed such that a user can switch the color light emitting display and the reflection display with a predetermined desirable timing. As described in the embodiment 1 of the device, the portable information terminal 260 is also constructed such that the color light emitting display and the reflection display are automatically switched by control software and application of the device.

The device having the display unit of the invention is not limited to the above portable phone and the portable information terminal, but can be also applied to a device having a display for displaying certain information at any time, e.g., a home electric device. If the display device of the invention is applied to the display of a home electric device, for example, it is possible to use a method in which reflection display low in power consumption is normally performed, and is switched to the color light emitting display, etc. at any time at a time of use of the electric device or by commands of control software. Accordingly, the visual recognition property of information displayed by the device is improved, and the convenience for the user can be greatly improved.

As explained above, in accordance with the display unit of the invention, switching of the driving method of the display element is controlled simultaneously when on/off control of the light emitting means is performed. Further, the color light emitting means is arranged between the reflecting means of external light and the light polarizing state modulating means. Accordingly, a display unit with reduced power consumption and high image quality can be provided.

The invention claimed is:

1. A display device comprising:
   colored-light emitting means for emitting colored light to effect a colored light-emitting display;
   reflection means for reflecting external light to effect a monochromatic reflection display;
   light polarizing state modulating means for modulating a polarizing state of the colored light;
   a colored signal processing section for processing a received image signal to effect driving of image display on the colored light-emitting display, and a monochromatic signal processing section for processing the received image signal to effect driving of image display on the monochromatic reflection display; and switching means for selecting lighting according to one of the colored light emitting means for a color display mode and the reflection means for a monochromatic display mode, and for selecting processing and driving according to one of the colored signal processing section for the color display mode and the monochromatic signal processing section for the monochromatic display mode, on a basis of the received image signal;

wherein the colored light emitting means comprises an organic LED layer, the reflection means comprises an anode of the organic LED layer, and the light polarizing state modulating means comprises a polarizing plate, a phase difference plate and a liquid crystal layer.

2. A display device according to claim 1, comprising a common electrode which functions as both an electrode operating the organic LED and an electrode operating the liquid crystal layer, the electrodes being operable at substantially a same electric potential.

3. A display device according to claim 2, wherein common wiring of the common electrode is arranged between the organic LED and the liquid crystal layer.

4. A system comprising:
   at least one of: a casing, an antenna, a speaker, an input key, a microphone, a camera, a battery, an infrared interface, and operating system (OS) software; and,
   a display device including:
     colored-light emitting means for emitting colored light to effect a colored light-emitting display;
     reflection means for reflecting external light to effect a monochromatic reflection display;
     light polarizing state modulating means for modulating a polarizing state of the colored light;
     a colored signal processing section for processing a received image signal to effect driving of image display on the colored light-emitting display, and a monochromatic signal processing section for processing the received image signal to effect driving of image display on the monochromatic reflection display; and
     switching means for selecting lighting according to one of the colored light emitting means for a color display mode and the reflection means for a monochromatic display mode, and for selecting processing and driving according to one of the colored signal processing section for the color display mode and the monochromatic signal processing section for the monochromatic display mode, on a basis of the received image signal;
     wherein the colored light emitting means comprises an organic LED layer, the reflection means comprises an anode of the organic LED layer, and the light polarizing state modulating means comprises a polarizing plate, a phase difference plate and a liquid crystal layer.

5. A system according to claim 4, comprising a common electrode which functions as both an electrode operating the organic LED and an electrode operating the liquid crystal layer, the electrodes being operable at substantially a same electric potential.

6. A display device according to claim 5, wherein common wiring of the common electrode is arranged between the organic LED and the liquid crystal layer.

* * * * *